United States Patent [19]

Barber, Jr. et al.

[11] Patent Number: 5,737,794
[45] Date of Patent: Apr. 14, 1998

[54] COMPOSITE ABRASIVE FILAMENTS, METHODS OF MAKING SAME, ARTICLES INCORPORATING SAME, AND METHODS OF USING SAID ARTICLES

[75] Inventors: Loren L. Barber, Jr., Lake Elmo; Dennis G. Welygan, Woodbury; Richard M. Pihl, Cottage Grove, all of Minn.

[73] Assignee: Minnesota Mining and Manufacturing Company, St. Paul, Minn.

[21] Appl. No.: 767,373

[22] Filed: Dec. 16, 1996

Related U.S. Application Data

[60] Continuation of Ser. No. 67,053, May 25, 1993, Pat. No. 5,616,411, which is a division of Ser. No. 853,799, Mar. 19, 1992, abandoned.

[51] Int. Cl.$^6$ ................... D02G 3/00; C09K 3/14; A47L 13/10
[52] U.S. Cl. ................... 15/229.12; 15/229.12; 428/365; 428/366; 428/367; 428/368
[58] Field of Search .............. 15/229.12; 428/365, 428/366, 367, 8

[56] References Cited

U.S. PATENT DOCUMENTS

| 2,328,998 | 9/1943 | Radford . |
| 2,643,945 | 6/1953 | Buckner . |
| 2,682,734 | 7/1954 | Peterson . |
| 2,793,478 | 5/1957 | Rohowetz . |
| 2,826,776 | 3/1958 | Peterson . |

(List continued on next page.)

FOREIGN PATENT DOCUMENTS

| 0282 243 | 9/1988 | European Pat. Off. . |
| 0 513 798 | 11/1992 | European Pat. Off. . |
| 2624773 | 9/1988 | France . |
| 53-004280 | 3/1978 | Japan . |
| 56-157956 | 3/1982 | Japan . |
| 6/21376 | 12/1985 | Japan . |
| 60-252715 | 12/1985 | Japan . |
| 61-257777 | 10/1986 | Japan . |
| 61-260977 | 4/1987 | Japan . |
| 61-090877 | 9/1987 | Japan . |
| 63-147622 | 10/1988 | Japan . |
| 63-147622 A | 10/1988 | Japan . |

OTHER PUBLICATIONS

Product Literature: Carlson Model Y, Continuous Metal Strip Brush Machine.

Product Literature: 3M "Brushlon Products, Belts, Wheels, Discs, Rolls & Cyclinder Brushes," Brochure No: 60-440-0387-3(653)K, 1983.

Society of Manufacturing Engineers, Developing and Emerging Trends in Brushing and Buffing, Scheider, MR83-682, 1983.

Watts, J.H., "Abrasive Monofilaments–Critical Factors That Affect Brush Tool Performance", Society of Manufacturing Engineers Technical Paper, 1988.

*Thermoplastic Elastomers, A Comprehensive Review*, edited by N.R. Legge, G. Holden, and H.E. Schroeder, Hanswer Publishers, NY 1987.

Design News, May 22, 1989, p. 40.

R.D. Lundberg, "Ionic Polymers," *Encyclopedia of Polymer Technology*, vol. 8, 1985, pp. 393–423.

(List continued on next page.)

*Primary Examiner*—Richard Weisberger
*Attorney, Agent, or Firm*—Doreen S. L. Gwin; Paul W. Busse

[57] ABSTRACT

A composite abrasive filament, including at least one preformed core at least partially coated with a hardened, abrasive-filled thermoplastic elastomer, exhibits increased abrading life over previously known abrasive filaments. Also disclosed are methods of making such filaments and using such filaments in article form to abrade a variety of workpieces.

2 Claims, 13 Drawing Sheets

U.S. PATENT DOCUMENTS

| | | |
|---|---|---|
| 2,845,648 | 8/1958 | Peterson . |
| 2,878,048 | 3/1959 | Peterson . |
| 2,920,947 | 1/1960 | Burk et al. . |
| 2,984,053 | 5/1961 | Peterson . |
| 3,016,554 | 1/1962 | Peterson . |
| 3,076,219 | 2/1963 | Peterson . |
| 3,090,061 | 5/1963 | Charvat . |
| 3,134,122 | 5/1964 | Charvat . |
| 3,146,560 | 9/1964 | Hurst . |
| 3,260,582 | 7/1966 | Zimmer, Jr. et al. . |
| 3,522,342 | 7/1970 | Nungesser et al. . |
| 3,547,608 | 12/1970 | Kitazawa . |
| 3,554,974 | 1/1971 | Mommaerts et al. . |
| 3,645,976 | 2/1972 | Suzuki et al. . |
| 3,669,850 | 6/1972 | Draca . |
| 3,669,934 | 6/1972 | Epstein et al. . |
| 3,679,633 | 7/1972 | Matsubayashi et al. . |
| 3,696,563 | 10/1972 | Rands . |
| 3,781,172 | 12/1973 | Pett et al. . |
| 3,854,898 | 12/1974 | Whitney, Jr. et al. . |
| 3,891,408 | 6/1975 | Rowse et al. . |
| 3,893,826 | 7/1975 | Quinan et al. . |
| 3,947,169 | 3/1976 | Wolff et al. . |
| 4,097,246 | 6/1978 | Olson . |
| 4,172,440 | 10/1979 | Schneider et al. . |
| 4,314,827 | 2/1982 | Leitheiser et al. . |
| 4,456,654 | 6/1984 | Kotian . |
| 4,469,738 | 9/1984 | Himelreich, Jr. . |
| 4,469,739 | 9/1984 | Gretzinger et al. . |
| 4,505,720 | 3/1985 | Gabor et al. . |
| 4,507,361 | 3/1985 | Twilley et al. . |
| 4,518,397 | 5/1985 | Leitheiser et al. . |
| 4,574,003 | 3/1986 | Gerk . |
| 4,585,464 | 4/1986 | Haylock et al. . |
| 4,612,241 | 9/1986 | Howard, Jr. . |
| 4,627,950 | 12/1986 | Matsui et al. . |
| 4,652,275 | 3/1987 | Bloecher et al. . |
| 4,744,802 | 5/1988 | Schwabel . |
| 4,770,671 | 9/1988 | Monroe et al. . |
| 4,799,939 | 1/1989 | Bloecher et al. . |
| 4,866,888 | 9/1989 | Murai et al. . |
| 4,881,951 | 11/1989 | Wood et al. . |
| 4,945,687 | 8/1990 | Scheider et al. . |
| 5,049,597 | 9/1991 | Howard, Jr. . |
| 5,068,142 | 11/1991 | Nose et al. . |
| 5,082,720 | 1/1992 | Hayes . |
| 5,100,992 | 3/1992 | Cohn et al. . |
| 5,111,032 | 5/1992 | Batliwalla et al. . |

OTHER PUBLICATIONS

H. Schroeder and R.J. Cella, "Polyesters, Elastomeric" *Encyclopedia of Polymer Technology*, vol. 12, 1985, pp. 75–117.

N.R. Legge, "Thermoplastic Elastomers–The Future," *Elastomerics*, Oct. 1985.

C.P. Rader and J.H. Muhs, "Thermoplastic Elastomers–Introduction to TPEs," *Modern Plastics*, Mid–Oct. 1989 Encyclopedia Issue, pp. 122–132.

Thermoplastic Elastomers, A Comprehensive Review, N.R. Legge et al., pp. 459–464 (1987).

"Prevail Thermoplastic Resins", Dow Plastics, Nov. 1990.

"Prevail Thermoplastic Resins", 3050 Resins (product information, Nov. 1990).

"Prevail Thermoplastic Resins", 3100 Resin (product information, Nov. 1990).

"Prevail Thermoplastic Resins", 3150 Resin (product information Nov. 1990).

"Prevail Thermoplastic Resins", Chemical Ersistance, Nov. 1990.

"Material Safety Data Sheet—Prevail 3100", Feb. 6, 1992.

"Material Safety Data Sheet—Prevail 3050", Feb. 6, 1992.

"Material Safety Data Sheet—Prevail 3150", Feb. 6, 1992.

COMPOSITE ABRASIVE FILAMENTS, METHODS OF MAKING SAME, ARTICLES INCORPORATING SAME, AND METHODS OF USING SAID ARTICLES

CROSS-REFERENCE TO RELATED APPLICATIONS

This is a continuation of application Ser. No. 08/067,053 filed May 25, 1993, now U.S. Pat. No. 5,616,411, which is a divisional of Ser. No. 07/853,799, filed Mar. 19, 1992, now abandoned.

TECHNICAL FIELD

The present invention relates to composite abrasive filaments comprising preformed cores coated with an abrasive-filled thermoplastic elastomer.

BACKGROUND ART

Nylon abrasive filaments were developed in the late 1950's as a man made alternative to natural abrasive filaments. At about that time an extrusion process was developed for dispersing abrasive particles uniformly in a nylon matrix in the form of a filament (U.S. Pat. Nos. 3,522,342 and 3,947,169). A review of nylon abrasive filaments is presented by Watts, J. H., "Abrasive Monofilaments-Critical Factors that Affect Brush Tool Performance", Society of Manufacturing Engineers Technical Paper, 1988, a written version of a presentation by the author at the WESTEC Conference, held Mar. 21–24, 1988. As explained by Watts, as filaments of this type wear, new abrasive particles are exposed. An abrasive filament brush tool made using a plurality of these filaments is thus regenerated during use. Some of the advantages of nylon abrasive filaments are their safety, cleanliness, cutting speed, low cost, superior radius and finish control, adaptability, and ease in design.

A key property of nylon and other thermoplastic materials is its "memory". In a brush filament this is referred to in the art as "bend recovery", or the tendency for a deflected filament to return to its original deployment. The bend recovery for nylon is generally over 90%, i.e., the filament returns to about 90% of its original deployment after being deflected.

Over time in operation, such as in a brush tool, most abrasive-filled polymeric filaments will take a set shape, and unless the filaments of the brush tool recover, the brush tool becomes soft and loses its effectiveness. Bend recovery is determined by filament diameter, relaxation time, strain, deflection time, and environmental conditions. Among synthetic filaments made to date, nylon offers the best bend recovery from strain held for an extended period of time.

While adequate for many purposes, the inventors herein have found that the various nylons have property limitations which make their use less than optimal in abrasive filaments. Nylon abrasive filaments have limited stiffness and may lose their stiffness as filament temperature approaches 70° C., and thus may not be suitable for removing heavy scale or burrs when elevated filament temperatures are developed. Temperature resistance is critical in maintaining filament stiffness. Elevated temperatures generally affect all nylon polymers in a similar way: stiffness, as measured by the bending (tangent) modulus, decreases as temperature increases. Heat generation is normally not a problem in long filament deburring where brush tool speeds are low. However, in short trim power brushes, tool pressure on the part and/or high speed in a dry environment can generate high temperatures at the filament tips.

Another limitation of nylon abrasive filaments is that moisture from any source can have a noticeable affect on nylon filament brush tool performance. Moisture affects filament stiffness and thereby tool aggressiveness. Nylon 6,12 retains stiffness better than other nylon materials and is 2–3 times stiffer than other types of nylon in high humidity or when saturated with oils, solvents or when water is present.

In all abrasive filled polymeric filaments, as the degree of abrasive loading increases, the tensile strength and flex fatigue resistance tend to decrease, due to insufficient binding of abrasive and polymer. Bending modulus for a filament can be simply defined as the resistance to bending. This is an inherent characteristic of the polymer used for the abrasive filament. Bending modulus is generally independent of the filament diameter, and since the bending modulus of a family of abrasive filaments made from the same polymer will be the same, the main characteristics which affect filament stiffness are the diameter and length of the filament.

The abrasive cutting ability of abrasive-filled nylon filaments exhibits the distinct characteristic of cutting relatively well at the onset of the operation, followed by clear loss of abrasive action within about 1 hour. FIG. 7 shows the degradation in cutting ability of abrasive-filled nylon filaments, filled with a typical aluminum oxide abrasive, when the filaments are attached to a hub to form a brush and the hub rotated so that the filaments strike (and therefore abrade) a stationary workpiece. FIG. 7 represents the cut obtained on a flat carbon steel (1018) plate as a function of time at a constant load of 1.36 Kg. Equipment is typically designed to reverse the brush operation to restore the abrasive action to its original level of activity. An abrupt increase in cut can be achieved if the brush is "dressed", for example, by operating the brush against a wire screen. This is shown at 2 hours 15 minutes in FIG. 7. Another problem associated with abrasive-filled nylon filaments is their poor flex fatigue resistance. Over extended periods of operation the filaments tend to break near the point of attachment to the hub, an inconvenience to the user, resulting in decreased life and economic value of the brush.

The present invention addresses some of the problems mentioned above with abrasive-filled nylon and other filaments by presenting a composite abrasive filament comprising a preformed core coated with an abrasive-filled thermoplastic elastomer. This approach centers on the idea that a preformed core coated with an abrasive sheath has a higher initial bending modulus, a more constant binding modulus as a function of time, temperature, humidity and chemical environment, and higher tensile strength than an abrasive-filled thermoplastic filament.

Composite abrasive filaments having a preformed core are to be distinguished structurally from filaments comprising either an abrasive-filled core or sheath wherein the core and sheath are typically co-extruded and have similar mechanical properties, such as tensile strength. (These latter "in situ" core filaments are the subject of assignee's co-pending application, cross-referenced above.) Tensile strength may be significantly higher in composite abrasive filaments due to the tensile strength of the preformed core. Composite abrasive filaments may allow for up to twice the loading of abrasive grains into the thermoplastic elastomer coating without exhibiting significantly reduced flex fatigue resistance compared with abrasive-filled nylon filaments. Much higher levels of initial and continued abrasive action were observed than would have been expected from the increase in abrasive loading. This behavior relates to the compositional nature of the thermoplastic elastomers as well as to the method of preparation of the composite abrasive filaments.

Experimentation with and production of abrasive filaments has a long history. U.S. Pat. No. 2,328,998, Radford, discloses abrasive tools made from monofilaments containing abrasive particles either throughout the filament or in the sheath or core of a sheath-core structure. The filament may be made of cellulose ester, resins, or thermoplastic polymers (for example, nylon). The use of thermoplastic elastomers is not taught or suggested.

U.S. Pat. No. 2,643,945, Buckner, describes a device wherein a cotton cord is coated with abrasive grains using a furfuryl resin and then wound convolutely onto a core to produce a grinding or cut-off wheel.

U.S. Pat. No. 2,793,478, Rohowetz, describes abrasive filaments comprising a core consisting of a single strand or twisted, woven group of strands of metal, glass, or synthetic polymer, with a layer of flexible thermosetting resinous material permanently bonded to the core, and particles of abrasive material permanently embedded in the resinous material. A second embodiment describes a core, a layer of thermoplastic adhesive, a layer of thermosetting resin permanently bonded to the thermoplastic layer, with abrasive grains permanently embedded in the thermosetting layer. The use of thermoplastic elastomers is not taught or suggested.

U.S. Pat. No. 2,920,947, Burk et al., describes a core-sheath composition of a linear polyamide bristle having a surface coating of synthetic linear polyamide in which exposed solid abrasive particles are embedded, the particles being held in position by adhesion. A method for preparation is also presented which comprises coating a bristle with an aqueous dispersion of linear polyamide containing 5-50% abrasive, and drying the coating above 100° C.

U.S. Pat. No. 3,146,560, Hurst, describes abrasive filaments comprising preformed synthetic filaments coated with a binder containing abrasive particles. The abrasive coated filaments are used to make abrasive articles. The synthetic filaments are typically a plurality of strands, each of which is formed from glass fibers that are twisted together. The binder is preferably a phenolic resin but can also include animal glue, compounded neoprene, and the like, or a synthetic resin such as resorcinol-formaldehyde resin or an aniline-formaldehyde, polyester, silane, epoxy or polyurethane resin. The use of thermoplastic elastomer binders is not taught or suggested.

U.S. Pat. No. 3,260,582, Zimmer et al. describes nonwoven polishing and abrading pads formed using long, continuous filaments of preformed and crimped synthetic cores coated with adhesives containing abrasive grains. Preferred preformed cores are polyamides, such as nylon, or polyester filaments. Other preformed cores disclosed are those capable of being thermoformed including the vinylidenes, olefins, fluorocarbons, acrylonitriles and acrylics. Adhesives may vary from the elastomeric to the hard, heat-advancing resinous type such as the polyurethane or phenol-aldehyde based adhesives. Again, the use of thermoplastic elastomers is not suggested.

U.S. Pat. No. 3,522,342, Nungesser et al., (mentioned above) describes apparatus and methods for making abrasive bristles having an abrasive filler, the apparatus utilizing two extruders. The method comprises melting a thermoplastic material in a first extruder and adding the abrasive filler to the molten thermoplastic through a second extruder, and extruding the mixture through a die which directs the output into a cooling water bath. Typical thermoplastic materials disclosed as useful include the nylons, polypropylene, polycarbonate, acetals, acrylics, polyethylene, polyurethane, polyvinylchloride, and combinations of nylon and a polyester, etc. The use of thermoplastic elastomers is not taught or suggested.

U.S. Pat. No. 3,547,608, Kitazawa, describes a method of manufacturing an impregnated fibrous grinding article, the method comprising feeding abrasive particles and a thermosetting resinous binder into the center of a rotary woven yarn while the yarn is rotary driven. After curing the binder, the composite is formed into a grinding article.

U.S. Pat. No. 3,669,850, Draca, describes an abrasive brushing element comprising a wire bristle having an outer layer of metal that binds very fine abrasive powders. An abrasive powder is electrostatically attracted to the tips of the wire bristles followed by electroplating the bristles with nickel.

U.S. Pat. No. 3,696,563, Rands, describes a brush comprising flexible filaments made from twisted metal or other appropriately flexible and heat resistant materials with a globule of abrasive filled material attached to the tip of each filament.

U.S. Pat. No. 3,854,898, Whitney, Jr., et al., describes automated methods for producing armored rods or aggressively coating a rod or wire substrate with a slurry of a flux paste adhesive and brazing metal powders, overcoating the latter with abrasive particles, followed by fusion of the brazing metal coating via heat.

U.S. Pat. No. 4,097,246, Olson, describes a method of making an abrasive wire for sawing stone, the abrasive wire comprising a support element such as a wire cable which is periodically coated with larger diameter elements which are coated with abrasives.

U.S. Pat. No. 4,172,440, Schneider et al., describes cutting filaments consisting of a linear monofilament of PET polyester into which from 0.3-10% by weight of an abrasive is incorporated. In the cutting process the abrasive particles are apparently not ripped off, as sometimes happens with steel wire cores bearing an abrasive on their surface, but the abrasive particles are said to be pressed into the monofilament.

U.S. Pat. No. 4,507,361, Twilley et al., describes low moisture absorption bristles of nylon and polyester. The bristles have a diameter of about 0.05–0.23 cm and are composed of about 10–30 wt. % polyamide based on total thermoplastic weight. The polyamide preferably has less than about 35% of its end groups being amine groups. The balance of the thermoplastic weight comprises polyethylene terephthalate having an intrinsic viscosity of at least 0.60. About 5 to about 50 wt. % of abrasive filler is included in each bristle.

U.S. Pat. No. 4,627,950, Matsui et al., describes a method of making a conjugate fiber comprising at least one layer composed of a polymer containing at least 20% by weight of abrasive particles and at least one coating layer substantially covering the abrasive layer. The coating layer is composed of a polymer containing substantially no abrasive particles. At least part of the coating layer apparently must be removed from the conjugate fiber (prior to its use as an abrasive filament) with a solvent to expose at least a part of the abrasive layer. Typical polymer coating layers include PET and nylon 6.

U.S. Pat. No. 4,585,464, Haylock et al., describes a low moisture absorption abrasive bristle of polybutylene terephthalate. The thermoplastic matrix comprising polybutylene terephthalate contains an abrasive filler and the bristles are made by the process of U.S. Pat. No. 3,522,342, mentioned above. The bristles are preferably stretched to a length about 2–4 times their extruded length for optimal tensile modulus and bend recovery.

U.S. Pat. No. 4,866,888, Murai et al., describes a wire encrusted with abrasive grains, produced by preparing a cylindrical metallic body having a metallic rod inserted into the central part of a metallic pipe, with a gap formed between the rod and the pipe, then filling the gap with a mixed powder comprising a metallic powder and abrasive grains. This structure is then hot and cold worked before removing the above-mentioned outermost metallic pipe.

U.S. Pat. No. 5,068,142, Nose et al., describes a fiber-reinforced polymeric resin composite material comprising a thermoplastic polymeric resin matrix which impregnates and covers a number of individual reinforcing fibers. Thermoplastics include nylon 6, nylon 66, polyolefins, polyesters, and others, while reinforcing fibers include carbon, glass, aramid, stainless steels, copper, and amorphous metal fibers. The composites do not contain abrasive material, nor is the use of thermoplastic elastomers taught or suggested.

French Patent Application No. 2,624,773, published Jun. 23, 1989, Ferrant et al., describes an abrasive wire consisting of a core made up of a man-made fiber such as an aramid fiber which acts as the strength member of the fiber. The core is then covered with an abrasive material that is held in place by a thermosetting resin binding agent that has been previously applied. The surface is then wrapped with a binding thread and a second coating of abrasive material is applied.

European Patent Application No. 0 282 243, published Sep. 14, 1988, Susa et al., describes abrasive filaments made of a composition which comprises 95–70 volume percent of a polyvinylidene fluoride resin, whose inherent viscosity ranges from 0.9 to 1.4, and 5–30 volume percent of abrasive grains. The abrasive filaments are produced by melt-spinning the composition and then stretching the resulting filaments at a draw ratio of 2.5 times–5.5 times within a temperature range of 100°–200° C.

It should be clear at this point that Applicant does not contend that he has been the first to incorporate abrasive grains into a plastic or resinous filament. It should also be clear that there is a distinction between filaments having a core-sheath arrangement and filaments having a preformed core coated with a plastic material filled with abrasive grains. The present invention is concerned with composite abrasive filaments comprising preformed cores at least partially coated with abrasive-filled thermoplastic elastomer compositions, which have the unexpected properties of allowing up to twice the loading of abrasive grains into the binding polymeric sheath while exhibiting many times the flex fatigue life compared to previously known filaments. Much higher levels of abrasive action were observed than would have been expected from the simple increase in abrasive loading.

Thermoplastic elastomers are defined and reviewed in *Thermoplastic Elastomers, A Comprehensive Review*, edited by N. R. Legge, G. Holden and H. E. Schroeder, Hanser Publishers, New York, 1987 (referred to herein as "Legge et al.", portions of which are incorporated by reference hereinbelow). Thermoplastic elastomers (as defined by Legge et al. and used herein) are generally the reaction product of a low equivalent weight polyfunctional monomer and a high equivalent weight polyfunctional monomer, wherein the low equivalent weight polyfunctional monomer is capable on polymerization of forming hard a segment (and, in conjunction with other hard segments, crystalline hard regions or domains) and the high equivalent weight polyfunctional monomer is capable on polymerization of producing soft, flexible chains connecting the hard regions or domains. This type of material has not been suggested for use in abrasive filaments.

"Thermoplastic elastomers" differ from "thermoplastics" and "elastomers" (a generic term for substances emulating natural rubber in that they stretch under tension, have a high tensile strength, retract rapidly, and substantially recover their original dimensions) in that thermoplastic elastomers, upon heating above the melting temperature of the hard regions, form a homogeneous melt which can be processed by thermoplastic techniques (unlike elastomers), such as injection molding, extrusion, blow molding, and the like. Subsequent cooling leads again to segregation of hard and soft regions resulting in a material having elastomeric properties, however, which does not occur with thermoplastics.

Some commercially available thermoplastic elastomers include segmented polyester thermoplastic elastomers, segmented polyurethane thermoplastic elastomers, segmented polyurethane thermoplastic elastomers blended with other thermoplastic materials, segmented polyamide thermoplastic elastomers, and ionomeric thermoplastic elastomers.

"Segmented thermoplastic elastomer", as used herein, refers to the sub-class of thermoplastic elastomers which are based on polymers which are the reaction product of a high equivalent weight polyfunctional monomer and a low equivalent weight polyfunctional monomer.

"Ionomeric thermoplastic elastomers" refers to a sub-class of thermoplastic elastomers based on ionic polymers (ionomers). Ionomeric thermoplastic elastomers are composed of two or more flexible polymeric chains bound together at a plurality of positions by ionic associations or clusters. The ionomers are typically prepared by copolymerization of a functionalized monomer with an olefinic unsaturated monomer, or direct functionalization of a preformed polymer. Carboxyl-functionalized ionomers are obtained by direct copolymerization of acrylic or methacrylic acid with ethylene, styrene and similar comonomers by free-radical copolymerization. The resulting copolymer is generally available as the free acid, which can be neutralized to the degree desired with metal hydroxides, metal acetates, and similar salts. A review of ionomer history and patents concerning same is provided in Legge et al., pp. 231–243.

The benefits of thermoplastic elastomers, including ease of processability combined with hard rubber characteristics, have given some unexpected abrasive binding and cutting properties. Composite abrasive filaments of the present invention comprising preformed cores and abrasive-filled thermoplastic elastomer coatings produce much higher levels of initial cut, maintain their higher cutting ability once an equilibrium condition has been achieved, and are much more resistant to flex fatigue failure than abrasive-filled nylon filaments.

SUMMARY OF THE INVENTION

The present invention overcomes or reduces many of the problems associated with previously known abrasive filaments. In accordance with the present invention, a composite abrasive filament is presented which includes at least one preformed core at least partially coated with a thermoplastic elastomer having abrasive particles dispersed and adhered therein, the thermoplastic elastomer and abrasive particles together comprising a hardened composition. It is considered within the scope of the invention to include more than one thermoplastic elastomer in the hardened composition, and the invention of course includes constructions wherein the composite abrasive filament has more than one layer of thermoplastic elastomer, with the proviso that at least one layer include abrasive particles.

As used herein the term "hardened" refers to the physical state of the thermoplastic elastomer when the temperature of the thermoplastic elastomer is below the melting or dissociation temperature of the hard regions (segmented thermoplastic elastomers) or ionic clusters (ionomeric thermoplastic elastomers), as determined through standard tests such as American Society of Testing Materials (ASTM) test D2117. The term can also be used describe the room temperature (i.e. about 10° to about 40° C.) hardness (Short D scale) of the thermoplastic elastomer. It is preferred that the room temperature Shore D durometer hardness of the thermoplastic elastomers used in the invention be at least about 30, more preferably ranging from about 30 to about 90, as determined by ASTM D790. The term is not meant to include physical and/or chemical treatment of the thermoplastic elastomer/abrasive particle mixture to increase its hardness.

As used herein the term "composite abrasive filament" means an abrasive filament having the hardened composition above described over at least a portion, preferably over the entire surface of at least one preformed core, where the ratio of the cross-sectional area of the hardened composition to that of the preformed core ranges from about 0.5:1 to about 300:1, preferably from about 1:1 to about 10:1, more preferably from about 1:1 to about 3:1, the cross-sections defined by a plane perpendicular to the composite abrasive filament major axis. The composite abrasive filaments can be of any length desired, and can of course be round, oval, square, triangular, rectangular, polygonal, or multilobal (such as trilobal, tetralobal, and the like) in cross-section.

"Preformed core", as used herein, means one or more core elements which are formed in a step separate from and prior to one or more coating steps, one of which coats the preformed core with abrasive-filled thermoplastic elastomer; in other words, a preformed core is not made simultaneously with the hardened composition. The cross-section of the preformed core is not limited as to shape; however, preformed cores having substantially round or rectangular cross-sections have been found suitable.

The preformed core preferably extends through the entire length of the filament, but this is not required. It is also not required that the preformed core cross-section have the same shape as the cross-section of the hardened composition, and the preformed core and hardened composition can be concentric or eccentric, with a single or plurality of core elements being within the invention. For ease of discussion only, the bulk of the disclosure to follow centers on constructions having a single, centrally located preformed core.

The preformed core can be continuous individual metallic wires, a multiplicity of continuous individual metallic wires, a multiplicity of non-metallic continuous filaments, or a mixture of the latter two, provided that the melting temperature of the preformed core is sufficiently high so that a coating of abrasive-filled molten thermoplastic elastomer can be applied to at least a portion of the preformed core, and the molten thermoplastic elastomer cooled rapidly enough to maintain the integrity of the preformed core.

Preferred preformed cores include single and multi-stranded metallic cores, e.g., plain carbon steels, stainless steels, and copper. Other preferred preformed cores include a multiplicity of non-metallic filaments e.g., glass, ceramics, and synthetic organic polymeric materials such as aramid, nylon, polyester, and polyvinyl alcohol.

"Thermoplastic elastomers" or "TPE" as used herein, refers to the class of polymeric substances which combine the processability (when molten) of thermoplastic materials with the functional performance and properties of conventional thermosetting rubbers (when in their non-molten state), and which are described in the art as ionomeric, segmented, or segmented ionomeric thermoplastic elastomers. The segmented versions comprise "hard segments" which associate to form crystalline hard domains connected together by "soft", long, flexible polymeric chains. The hard domain has a melting or disassociation temperature above the melting temperature of the soft polymeric chains.

Segmented thermoplastic elastomers are preferably the condensation reaction product of a high equivalent weight polyfunctional monomer having an average functionality of at least 2 and an equivalent weight of at least about 350, and a low equivalent weight polyfunctional monomer having an average functionality of at least about 2 and an equivalent weight of less than about 300. The high equivalent weight polyfunctional monomer is capable on polymerization of forming a soft segment, and the low equivalent weight polyfunctional monomer is capable on polymerization of forming a hard segment. Segmented thermoplastic elastomers useful in the present invention include polyester TPEs, polyurethane TPEs, polyamide TPEs, and silicone elastomer/polyimide block copolymeric TPEs, with the low and high equivalent weight polyfunctional monomers selected appropriately to produce the respective TPE.

The segmented TPEs preferably include "chain extenders", low molecular weight (typically having an equivalent weight less than 300) compounds having from about 2 to 8 active hydrogen functionality, and which are known in the TPE art. Particularly preferred examples include ethylene diamine and 1,4-butanediol.

Ionomeric TPEs are generally included by those skilled in the plastics processing art in the category of TPEs, and are useful as TPE's in this invention. Ionomeric TPEs are characterized by the formation of ionic clusters between two or more flexible "ionomer" (a word which is a contraction of "ionic polymer") chains, each ionic cluster being analogous to a hard crystalline domain in a TPE comprising segmented polymers. The ionomers, as above described, are the copolymerization product of a functionalized monomer with an olefinic unsaturated monomer.

Blends of TPE and thermoplastic materials are also within the invention, allowing even greater flexibility in tailoring mechanical properties of composite abrasive filaments of the invention.

Another aspect of the invention is an abrasive article comprising at least one type of composite abrasive filament, preferably mounted to a substrate such as a hub adapted to be rotated at a high rate of revolution, the filaments comprising a preformed core at least partially coated with thermoplastic elastomer having abrasive particles dispersed and adhered therein, the thermoplastic elastomer and abrasive particles together comprising a hardened composition. If the article includes more than one composite abrasive filament, they can be the same or different in composition and shape. The preferred composite abrasive filaments used in abrasive articles of the invention are application dependent, but stranded stainless steel wire, glass yarn, and aramid preformed cores, coated with an abrasive-filled polyester TPE, have proved useful in abrading many types of workpieces when attached to a rotating hub, while exhibiting greater resistance to flex fatigue than abrasive-filled nylon filaments.

A further aspect of the invention is a method of making a composite abrasive filament (as above described), the method including the steps of:
(a) rendering a TPE molten and combining abrasive particles therewith;
(b) coating at least a portion of a preformed core with a coating comprising the molten thermoplastic elastomer and abrasive particles; and
(c) cooling the coating to a temperature sufficient to harden the molten thermoplastic elastomer and thus form the hardened composition.

Preferred are methods wherein the TPE is segmented, wherein an extruder is used to render the TPE molten, and wherein the preformed core is stranded metallic or stranded non-metallic material. As used herein the term "molten" means the physical state of the TPE when it is heated to a temperature at least above the dissociation temperature of the hard regions or ionic clusters of the TPE under high shear mixing conditions.

Also presented is a method of abrading a workpiece with an abrasive article incorporating at least one composite abrasive filament of the invention attached to a substrate, the method comprising creating relative movement between a workpiece and the abrasive article so that the composite abrasive filament(s) contacts and abrades the workpiece. Useful substrates are metallic hubs, synthetic floor pads, wood, wood-like materials, and plastic. Alternatively, the composite abrasive filaments may abrade a workpiece without the benefit of a substrate, such as when a plurality of filaments are formed into a lofty, open mat, and the mat and/or workpiece moved against each other with pressure.

Other aspects and advantages of the invention will become apparent from the detailed description which follows.

DESCRIPTION OF PREFERRED EMBODIMENTS

As previously described, the present invention presents a composite abrasive filament comprising at least one preformed core at least partially coated with thermoplastic elastomer having abrasive particles dispersed and adhered therein, the thermoplastic elastomer and abrasive particles together forming a hardened composition.

Composite Abrasive Filament Embodiments

Four embodiments 10, 20, 30, and 40 of composite abrasive filaments in accordance with the present invention are illustrated in enlarged perspective views in FIGS. 1–4, where in each embodiment it will be appreciated that a portion of the hardened composition comprising TPE and abrasive particles has been removed to show the preformed cores.

Figure 1:
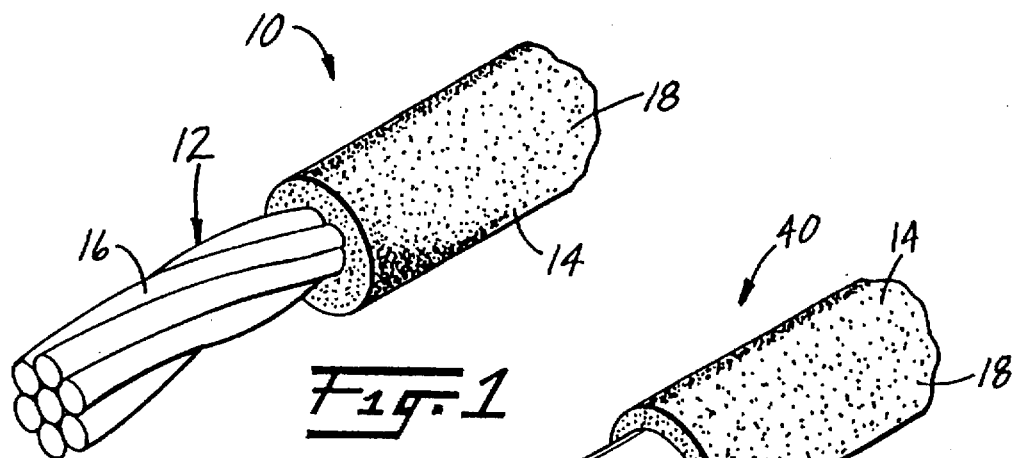
FIGS. 1–4 each show an enlarged perspective view of one of four embodiments of composite abrasive filaments in accordance with the present invention, each having a portion of its abrasive-filled TPE hardened composition removed to show the preformed core.

FIG. 1 shows an enlarged perspective view of composite abrasive filament 10, having a preformed core 12 partially covered by a hardened composition 14 of TPE and abrasive particles 18. Preformed core 12 in this embodiment is a 1×7 stranded preformed core, formed for example from seven individual stainless steel wires 16. The TPE of the hardened composition 14 has dispersed throughout and adhered therein a plurality of abrasive particles 18, such as aluminum oxide abrasive particles.

Figure 2:
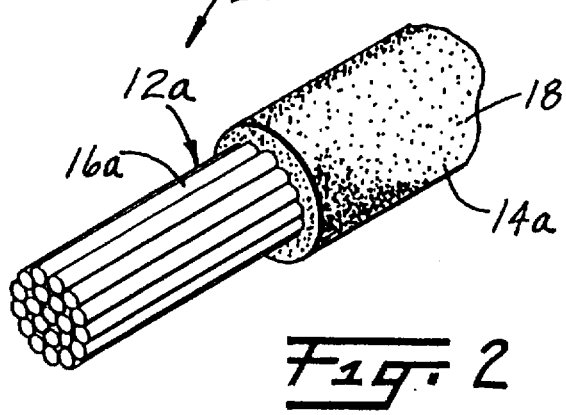
Figure 3:
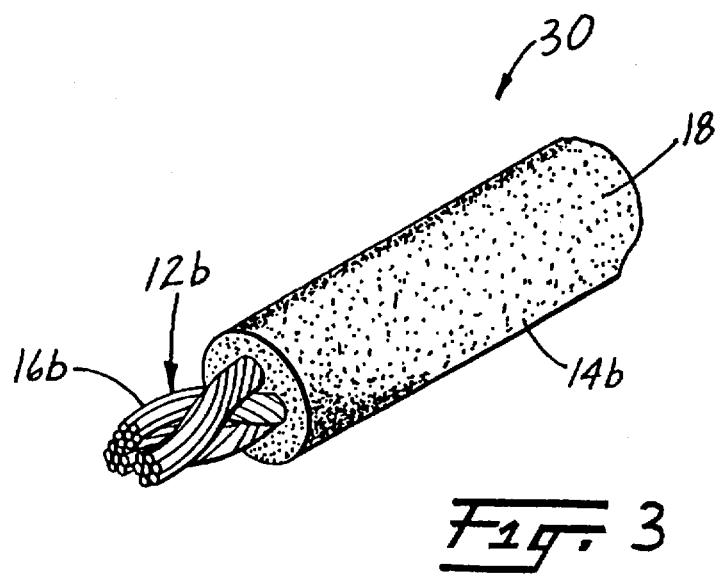

FIG. 2 shows an alternate composite abrasive filament embodiment, wherein the preformed core 12a is formed from a plurality of parallel, continuous metallic wires or non-metallic monofilaments 16a, while FIG. 3 shows a second alternate embodiment, wherein the preformed core 12b is a cable having 3×7 arrangement of three strands 16b, the strands in turn being each 1×7 strands of seven individual metallic wires or non-metallic monofilaments as in FIG. 1. The composite abrasive filaments 20 and 30 each have a hardened composition 14 of thermoplastic elastomer having abrasive particles 18 dispersed and adhered therein partially covering preformed cores 12a and 12b, respectively. Regarding the embodiment shown in FIG. 2, it should be noted that the hardened composition can be between the parallel monofilaments of the preformed core, so that the individual monofilaments are equally or unequally spaced apart.

Figure 4:
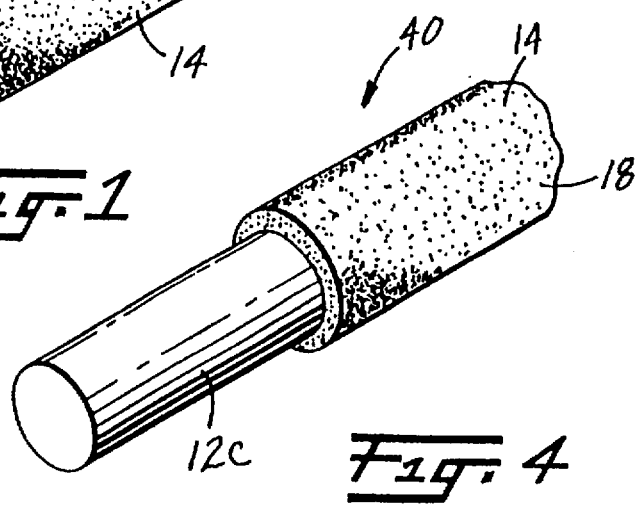

FIG. 4 shows an enlarged perspective view of another composite abrasive filament embodiment in accordance with the present invention. Preformed core 12c is this embodiment is a single continuous wire or monofilament of, for example, stainless steel or glass fiber. As with previous embodiments, core 12c has thereon a hardened composition 14 of TPE having dispersed and adhered therein a plurality of abrasive particles 18.

The composite abrasive filaments as shown schematically in FIGS. 1–4 may have preformed core and total composite abrasive filament diameters within a broad range, limited only by the size of the apparatus used to coat the preformed core with the molten TPE and the article to which the composite abrasive filaments are to be attached. Obviously, as the preformed core diameter of the composite abrasive filament increases, the number of composite abrasive filaments which can be attached to a substrate, such as a hub of a given size, decreases. Preformed core diameters for composite abrasive filaments of the present invention used on typical hand-held tools are preferably at least about 0.1 mm, while the composite abrasive filaments themselves preferably have a diameter ranging from about 1.0 mm to about 2.0 mm. These dimensions could, of course, increase tremendously for a large abrading device, and composite abrasive filaments having much larger preformed core and total diameters are considered within the scope of the appended claims.

Composite abrasive filaments of the invention having a diameter ranging from about 0.75 mm to about 1.5 mm have an ultimate breaking force (measured using a standard tensile tester known under the trade designation "Instron" Model TM, according to the test described below) of at least about 2.0 kg, a 50% fatigue failure resistance (i.e. the time require for 50% of the filaments in a given brush to detach from the brush at given conditions) of at least about 15 minutes; and an abrasion efficiency (i.e. weight of workpiece removed per weight of filament lost) on cold rolled steel (1018) plate of at least about 2. As may be seen by the examples herein below, balancing these preferences may be workpiece dependent.

Thermoplastic Elastomers

Segmented TPEs useful in the composite abrasive filaments of the present invention generally and preferably comprise the reaction product of a high equivalent weight polyfunctional monomer having a functionality of at least about 2 and an equivalent weight of at least about 350 adapted to form a soft segment upon polymerization, and a relatively low equivalent weight polyfunctional monomer having a functionality of at most about 2 and an equivalent weight of at most about 300, adapted to form a hard segment upon polymerization.

Chain extenders are typically used in segmented thermoplastic elastomers to increase the hard segment and hard domain size and thus provide one mechanism to alter the physical properties of the resultant segmented TPE. Chain extenders useful in the segmented TPEs of the present invention preferably have an active hydrogen functionality ranging from about 2 to 8, preferably from about 2 to 4, and more preferably from about 2 to 3, and an equivalent weight less than about 300, more preferably less than about 200. Well suited chain extenders are the linear glycols such as ethylene glycol, 1,4-butanediol, 1,6-hexanediol, and hydroquinone bis(2-hydroxyethyl) ether. Nonlinear diols are normally not suitable as chain extenders for segmented TPEs because the urethanes formed therefrom do not form well defined hard segments and therefore exhibit poor low and high temperature properties. Similarly, although low molecular weight polyfunctional amines including, aromatic, alkyl-aromatic, or alkyl polyfunctional amines, are normally excellent chain extenders, they normally cannot be used in the segmented TPEs of the present invention because the resultant urea groups in the resulting TPE melt well above the useful processing range of the TPE and undergo some degradation on melting.

Segmented TPEs useful in the composite abrasive filaments of the present invention preferably comprise segmented polyester TPEs, segmented polyurethane TPEs, and segmented polyamide TPEs. The low and high equivalent weight polyfunctional monomers are variously chosen to produce one of the above segmented TPEs. For example, if the TPE comprises a segmented polyester, such as the segmented copoly(etherester)s, the low and high equivalent weight polyfunctional monomers are preferably poly (tetramethylene terephthalate) and poly(tetramethylene oxide), respectively. If the TPE comprises a segmented polyurethane, the low equivalent weight polyfunctional monomer is preferably a polyfunctional isocyanate and the high equivalent weight polyfunctional monomer is preferably a polyfunctional amine.

The weight percent of low equivalent weight polyfunctional monomer in the total weight of monomers which react to produce segmented TPEs preferably ranges from about 20 to about 60 percent, more preferably ranging from about 20 to about 40 percent. Low equivalent weight polyfunctional monomer weight percentages above these ranges generally yield segmented TPEs exhibiting increased hardness, bending modulus, and tensile modulus, accompanied with an increase in glass transition temperature ($T_g$). At weight percentages of low equivalent weight polyfunctional monomer above about 70 weight percent, a phase transition occurs, which leads to a change in the overall behavior from that of a TPE to a more brittle plastic. At weight percentages of low molecular weight polyfunctional monomer below about 20, the TPE behavior more resembles a rubber, and at high filament temperatures, tool operating speeds, and force at which the abrasive article is moved against the workpiece, the composite abrasive filament may tend to "smear". (An industry term of art, "smear" refers to the transfer of portions of the abrasive article to the surface of the workpiece in the case of metal-working applications, or the glazing over of the article's surface in the case of wood-working applications. Smear occurs when heat is generated by frictional rubbing of the abrasive article against a workpiece.)

Ionomers useful in forming ionomeric TPEs typically and preferably comprise the reaction product of a functionalized monomer with an olefinic unsaturated monomer, or comprise a polyfunctionalized preformed polymer. Within the terms "ionomeric TPEs" and "ionomers" are included anionomers, cationomers, and zwitterionomers.

TPEs (segmented and ionomeric) useful in composite abrasive filaments of the invention preferably have Shore D durometer hardness values ranging from about 30 to about 90, more preferably ranging from about 50 to about 80, with the hardness of the segmented TPEs governed primarily by the relative equivalent weights and amounts of the low and high equivalent weight polyfunctional monomers, while hardness of ionomeric TPEs is primarily governed by relative amounts of functionalized monomer and olefinic unsaturated monomer.

The mechanical properties of segmented thermoplastic elastomers (such as tensile strength and elongation at break) are dependent upon several factors. The proportion of the hard segments in the polymers which form the TPEs, their chemical composition, their molecular weight distribution, the method of preparation, and the thermal history of the TPE all affect the degree of hard domain formation. Increasing the proportion of the low equivalent weight polyfunctional monomer tends to increase the hardness and the modulus of the resultant TPE while decreasing the ultimate elongation.

The upper use temperature of segmented TPEs is dependent upon the softening or melting point of the low equivalent weight polyfunctional monomer comprising the hard segments. For long term aging, the stability of the high equivalent weight polyfunctional monomer comprising the soft segment is also important. At elevated temperatures and with a lower percentage of hard segments which can contribute to hard domains, bending modulus and tensile strength of the TPE are generally reduced. As may be apparent to those skilled in the plastics processing art, to extend the upper useful temperature of a segmented TPE, it is necessary to introduce low equivalent weight polyfunctional monomers adapted to form hard domains which soften or melt at higher temperatures. However, although increasing the amount of or equivalent weight of low equivalent weight polyfunctional monomers can lead to higher TPE hardness, reduced elastic properties and reduced flex fatigue resistance of the composite abrasive filaments made therefrom may result.

Preferred TPEs having the above properties and useful in the invention include those formed from segmented polyesters represented by general formula I

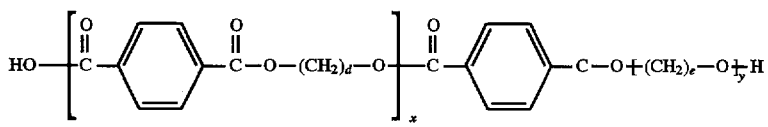

and mixtures thereof wherein d and e are integers each ranging from about 2 to about 6, and wherein d and e may be the same or different, but not differing by more than 1 integer; and x and y are integers selected so that the resulting segmented polyester TPE has a Shore D durometer hardness ranging from about 30 to about 90.

Total molecular weight (number average) of segmented polyesters within general formula I ranges from about 20,000 to about 30,000; x ranges from about 110 to about 125; and y ranges from about 30 to about 115, more preferably from about 5 to about 70.

Commercially available and preferred segmented polyesters represented by general formula I include those known under the trade designations "Hytrel 4056", "Hytrel 5556", "Hytrel 6356", "Hytrel 7246", and "Hytrel 8238" available from E.I. du Pont de Nemours and Company, Inc., Wilmington, Del. (du Pont), wherein both d and e are 4. Particularly preferred are the versions having Shore D hardness of 63 and 72 ("Hytrel 6356" and "Hytrel 7246", respectively). A similar family of thermoplastic polyesters are available under the tradenames "Riteflex" (Hoechst Celanese Corporation). A still further useful polyester is that known under the trade designation "Ecdel", form Eastman Chemical Products, Inc., Kingsport, Tenn.

The hardened compositions comprising thermoplastic elastomer and abrasive particles are of course not limited to those components. Glass fiber-reinforced polyester thermoplastic elastomers (trade designation "Thermocomp YF") are available from ICI Advanced Materials, LNP Engineering Plastics, Exton, Pa.

Preferred ionomers used to form ionomeric TPEs useful in the invention comprise the copolymerization reaction product of a functionalized monomer and an olefinic unsaturated monomer, the ionomers being represented by general formula II

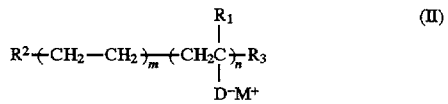

and mixtures thereof wherein $R^1$, $R^2$, and $R^3$ which may be the same or different and are selected from the group consisting of hydrogen, alkyl, substituted alkyl, aryl, and substituted aryl;

m and n are integers which may be the same or different which are selected so that the weight percentage of the functionalized monomer ranges from about 3 to about 25 weight percent of the total ionomer weight and so that the resulting ionomeric TPE has a Shore D durometer ranging from about 30 to about 90;

D is a functional group selected from the group consisting of COO and $SO_3$; and M is selected from the group consisting of Na, Zn, K, Li, Mg, Sr, and Pb.

Particularly preferred are those ionomers represented by general formula II wherein $R^1=R^2=R^3=CH_3$ and D=COO. A particularly preferred ionomer is when $R^1=CH_3$, D=COO, and M=Na, such an ionomer being commercially available, for example that known under the trade designation "Surlyn 8550" (du Pont).

The values of m and n are normally not given by manufacturers but are selected to provide the resulting ionomeric TPE with a room temperature Shore D durometer ranging from about 30 to about 90. Alternatively, m and n may be characterized as providing the molten ionomeric TPE with a flow rate (formerly termed "melt index" in the art) ranging from about 1 gm/10 mins to about 10 gms/10 mins (as per ASTM test D1238-86, condition 190/2.16, formerly D1238-79, condition E). Briefly, the test involves placing a sample within the bore of a vertical, heated cylinder which is fitted with an orifice at the bottom of the bore. A weighted piston is then placed within the cylinder bore, and the amount in grams of molten polymer exiting the cylinder through the orifice is recorded in grams for a 10 minute period.

The functionalized monomer may be selected from acrylic acid, methacrylic acid, vinyl acetate, and the like, and copolymers thereof, with acrylic and methacrylic acid particularly preferred.

The olefinic monomer may be selected from ethylene, propylene, butadiene, styrene, and the like, and copolymers thereof, with ethylene being the olefinic monomer of choice due to its availability and relatively low cost.

The functionalized monomer and olefinic monomer are typically and preferable directly copolymerized using free radicals, such methods being well known in the art and needing no further explanation herein.

Particularly preferred segmented polyamides useful in making segmented polyamide TPEs useful in the invention are those segmented polyamides represented by general formula III

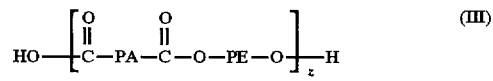

and mixtures thereof, wherein

PA=a difunctional polyamide having equivalent weight less than about 300;

PE=a dihydroxypolyether block having equivalent weight of at least 350 and comprising polymers selected from the group consisting of dihydroxypolyoxyethylene, dihydroxypolyoxypropylene, and dihydroxypolyoxytetramethylene; and z=an integer selected to provide the resulting segmented polyamide TPE with a Shore D durometer hardness ranging from about 30 to about 90.

Segmented polyamides within formula III are commercially available, such as those known under the trade designation "Pebax", available from Atochem Group of Elf Aquitaine, with the 63 and 70 Shore D durometer versions being particularly preferred in the present invention. Although values of z are proprietary to the manufacturers, and polymers within general formula III may be characterized according to hardness, they may alternatively be characterized according to their melt flow rate (as described above), with values ranging from about 1 gm/10 min to about 10 gm/10 min being preferred (ASTM 1238-86, 190/2.16).

Particularly preferred segmented polyurethanes useful in making polyurethane TPEs useful in the invention are those segmented polyurethanes represented by general formula IV and mixtures thereof wherein polyol=a polyester polyol or polyether polyol having an average molecular weight ranging from about 600 to about 4000; and t=an integer selected to provide the resulting segmented polyurethane TPE with a

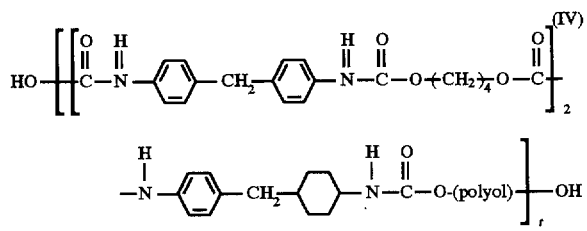

Shore D durometer hardness ranging from about 30 to about 90.

The value of "t" is chosen relative to the molecular weight of the polyol to give a range of molecular weights; typically and preferably, the number average molecular weight of segmented polyurethanes represented by general formula IV ranges from about 35,000 to about 45,000.

In general, segmented polyurethanes may be made by mixing the first and second polyfunctional monomers and chain extender together at temperatures above about 80° C. Preferably, the ratio of isocyanate functional groups to isocyanate reactive groups ranges from about 0.96 to about 1.1. Values below about 0.96 result in polymers of insufficient molecular weight, while above about 1.1 thermoplastic processing becomes difficult due to excessive crosslinking reactions.

Segmented polyurethanes within formula IV which are commercially available and preferred are those known under the trade designation "Estane", available from B.F. Goodrich, Cleveland, Ohio, particularly grades 58409 and 58810. Other segmented preferred segmented polyurethanes include those known under the trade designations "Pellethane", and "Isoplast" from The Dow Chemical Company, Midland, Mich. (Dow Chemical), and those known under the trade designation "Morthane", form Morton Chemical Division, Morton Thiokol, Inc.; and those known under the trade designation "Elastollan", from BASF Corporation, Wyandotte, Mich.

As mentioned previously, blends of TPEs and other polymers have also proven useful, such as the polyurethane/ acrylonitrile-butadiene-styrene blends known under the trade designation "Prevail", grades 3050, 3100, and 3150, all from Dow Chemical. Grade 3050 has a melt flow rate (ASTM-1238-86, 230/2.16) of 26 gm/10 min, and a Shore D hardness of about 62.

Block copolymers regarded by those skilled in the plastics processing art as TPEs, including the elastomeric copolymers of silicones and polyimides, may also prove useful in composite abrasive filaments of the invention. Commercially available elastomeric copolymers of thermoplastic silicones and polyimides include those known under the trade designation "Siltem STM-1500", from GE Silicones. These copolymers have a tensile strength of about 25 MPa, elongation of 105%, and flexural modulus of about 415 MPa, according to published values (Design News, May 22, 1989, page 40).

Each of the polymers within formulas I–IV as shown above are now discussed in greater detail.

Segmented Polyesters

As noted above, if the TPE is based on a segmented polyester, such as the segmented copoly(etherester) as shown in formula I, the low and high equivalent weight polyfunctional monomers are preferably based on poly (tetramethylene terephthalate) which forms the hard segment upon polymerization and poly(tetramethylene oxide) which forms the soft segment upon polymerization, respectively. The poly(ether) component of the copoly(etherester) is preferably derived from α-hydro-ω-hydroxyoligo (tetramethylene oxide) of number average molecular weight ranging from about 1,000 to about 2,000. The copoly(ester) component of the copoly(etherester) is preferably based on poly(tetramethylene terephthalate) which forms hard segments upon polymerization, having average molecular weights ranging from about 600 to about 3,000. The molecular weight for copoly(etherester) polyesters within formula I preferably ranges from about 20,000 to about 40,000. For a more comprehensive discussion of segmented polyesters, see Legge et al. pages 164–196, incorporated by reference herein.

Ionomers

Ionomers which may behave as ionomeric TPEs and thus useful in the present invention, such as those ionomers known under the trade designation "SURLYN" (formula II), are preferably prepared by copolymerization of a functionalized monomer and an olefinic unsaturated monomer, or by direct functionalization of a preformed polymer, as previously noted. Ionomers within formula II are particularly preferred for forming ionomeric TPEs for use in hardened compositions in composite abrasive filaments of the invention. The large quantities of commercial quality ethylene/ methacrylic acid copolymers, for example containing between about 5 and about 20 weight percent methacrylic acid component, makes these ionomers particularly useful in the present invention.

M in formula II is typically and preferably chosen from sodium (Na) and zinc (Zn), although ionomers using potassium (K), lithium (Li), magnesium (Mg), strontium (Sr) and lead (Pb) are considered within the scope of formula II.

The use of sodium as the cation in formula II may be desired where water absorption by the ionomeric TPE on the composite abrasive filaments is not a concern, whereas zinc exhibits a much lower water absorption and is thus preferred where water absorption is a concern. Ionomers are preferably neutralized while in the melt, preferably with a metallic reagent added as an oxide, hydroxide or methylate, either dry or as a concentrated solution. As neutralization proceeds, the melt increases in elasticity. Stiffness increases with degree of neutralization, reaching a plateau at about 40% neutralization. However, tensile strength continues to increase at higher levels of neutralization. A preferred degree of neutralization is about 70% to 80% neutralization, since tensile strength of ionomeric TPEs usually plateaus at this point. Neutralization is preferably achieved by the use of metallic acetates, the acetic acid being removed by volatilization. Acetates of zinc, lead, copper, barium, cobalt and nickel all give clear melts and quantitative "cross-linking". A further discussion of ionomers is presented in Legge, et al., pages 231–268, incorporated by reference herein.

Segmented Polyamides

Polyamides within formula III and useful forming segmented polyamide TPEs for use in the invention are typically described as polyether block amides (or "PEBA"), wherein the latter may be obtained by the molten state polycondensation reaction of dihydroxypolyether blocks and dicarboxylic acid-based polyamide blocks as shown in formula III (wherein PA represents "polyamide" and PE represents "polyether"). Dicarboxylic polyamide blocks may be produced by the reaction of polyamide precursors with a dicarboxylic acid chain limiter. The reaction is preferably carried out at high temperature (preferably higher than 230° C.) and preferably under pressure (up to 2.5 MPa). The molecular weight of the polyamide block is typically controlled by the amount of chain limiter.

The polyamide precursor can be selected from amino acids such as aminoundecanoic acid and aminododecanoic acid; lactams, such as caprolactam, lauryl lactam, and the like); dicarboxcylic acids (such as adipic acid, azelaic acid, dodecanoic acid, and the like); and diamines (such as hexamethylene diamine, dodecamethylene diamine, and the like).

The dihydroxypolyether blocks may be produced from polyether precursors by either of two different reactions: an ionic polymerization of ethylene oxide and propylene oxide to form dihydroxypolyoxyethylene and dihydroxypolyoxypropylene polyether precursors; and cationic polymerization of tetrahydrofuran for producing dihydroxypolyoxytetramethylene polyether precursors.

The polyether block amides are then produced by block copolymerization of the polyamide precursors and dihydroxypolyether precursors. The block copolymerization is a polyesterification, typically achieved at high temperature (preferably ranging from 230° to 280° C.) under vacuum (10 to 1,400 Pa) and the use of an appropriate catalyst such as Ti(OR)$_4$, where R is a short chain alkyl. It is also generally necessary to introduce additives such as an antioxidant and/or optical brighteners during polymerization.

The structure of the resulting polyether block amides comprises linear, regular chains of rigid polyamide segments and flexible polyether segments. Since polyamide and polyether segments are not miscible polyether block amides such as those represented by formula III present a "biphasic" structure wherein each segment offers its own properties to the polymer. Owing to the structure, it is possible to alter four basic chemical criteria to control the physical properties of the polyether block amide: the nature of the polyamide block, the nature of the polyether block, the length of the polyamide blocks and the mass relationship between the polyamide and polyether blocks. The nature of the polyamide block influences the melting point, specific gravity, and chemical resistance of the polyether block amide, while the polyether block influences the glass transition temperature, hydrophilic properties, and anti-static performance. The length of the polyamide block influences the melting point of the polymer, and the mass relationship of the polyamide and polyether blocks controls the hardness properties. For example, it is possible to synthesize grades of polyether block amides having Shore hardness ranging from about 75 D to as low as about 60 A. Increasing polyether content generally reduces tensile strength and elastic nature of the polyether block amides. (See Legge et al., pages 217–230, incorporated by reference herein.)

Segmented Polyurethanes

Segmented polyurethane TPEs useful in the present invention are preferably formed from segmented polyurethanes within formula IV, which are comprised of a high equivalent weight polyfunctional monomer and a low equivalent weight polyfunctional monomer as above described, and may also include a low molecular weight chain extender, also as above described. In thermoplastic polyurethane elastomers, the hard segment is formed by addition of the chain extender, for example, 1,4-butane diol, to a diisocyanate, for example, 4,4'-diphenylmethane diisocyanate (MDI). The soft segment consists of long, flexible polyether or polyester polymeric chains which connect two or more hard segments. At room temperature, the low melting soft segments are incompatible with the polar, high melting hard segments, which leads to a microphase separation.

Polyurethanes useful in forming segmented polyurethane TPEs are generally made from long chain polyols having an average molecular weight ranging from about 600 to 4.000 (high equivalent weight polyfunctional monomer), chain extenders with a molecular weight ranging from about 60 to about 400, and polyisocyanates (low equivalent weight polyfunctional monomer). Preferred long chain polyols are the hydroxyl terminated polyesters and the hydroxyl terminated polyethers.

A preferred hydroxyl terminated polyester is made from adipic acid and an excess of a glycol such as ethylene glycol, 1,4-butanediol, 1,6-hexanediol, neopentyl glycol, or mixtures of these diols. The reaction producing the hydroxyl-terminated polyesters from these ingredients is preferably carried out at temperatures up to about 200° C., with the resulting polyester having an acid number of less than about 2, and composed of all possible oligomers ranging from monomeric glycol to high molecular weight species. Other acids which may be used in the production of hydroxyl terminated polyesters include azelaic acid, and terephthalic acid, either alone or in mixture with adipic acid. Generally, the presence of aromatic or cycloaliphatic rings in the acid or in the diol increases the glass transition temperature of the hydroxyl-terminated polyester. Polycaprolactones and aliphatic polycarbonates may be preferable in some applications due to their unique physical properties. The polycaprolactones are preferably made from ε-caprolactone and a bifunctional initiator, for example, 1,6-hexanediol. The polycarbonates offer excellent hydrolytic stability and are made from diols, for example, 1,6-hexanediol, and phosgene, or by transesterification with low molecular weight carbonates like dimethyl or diethylcarbonate.

Long chain polyether polyols useful in making polyurethanes within formula IV useful in making segmented polyurethane TPEs useful in composite abrasive filaments of the invention are preferably of two classes: the poly (oxypropylene)glycols and the poly(oxytetramethylene) glycols. The former glycols may be made by the base catalyzed addition of propylene oxide and/or ethylene oxide to bifunctional initiators, for example, propylene glycol or water, while the latter may be made by cationic polymerization of tetrahydrofuran. Both of these classes of polyethers have a functionality of about 2. The mixed polyethers of tetrahydrofuran and ethylene or propylene oxide may also be effectively used as the soft segment in the polyurethane TPE.

In contrast to other polyurethanes, only a few polyisocyanates are suitable for producing thermoplastic elastomer polyurethanes. The most useful preferred polyisocyanate is MDI, mentioned above. Others include hexamethylene diisocyanate (HDI), 1-isocyanato-3-isocyanatomethyl-3,5,5-trimethylcyclohexane (IPDI); 2,4 and 2,6-toluene diisocyanate (TDI); 1,4 benzene diisocyanate, and trans-cyclohexane-1,4-diisocyanate.

The hardened composition comprising TPE and abrasive particles of the composite abrasive filaments of the present invention preferably covers the entire preformed core, although this is not a requirement. The hardened composition could conceivably cover only that side of the preformed core which strikes the workpiece, and composite abrasive filaments of this construction are considered within the scope of the invention. As would be obvious to skilled artisans, the hardened composition need not have the same outer configuration as the core; for example, the hardened composition could have a rectangular or triangular cross-section while the preformed core is roughly circular in cross-section. When the hardened composition completely coats the preformed core, as in the preferred composite abrasive filament constructions shown in FIGS. 1–4 (discussed above), the ratio of cross-sectional area of the hardened composition to the cross-sectional area of the preformed core may vary within a broad range, from about 0.5:1 to about 300:1. More preferably, the ratio of cross-sectional areas ranges from about 1:1 to about 10:1, particularly preferably about 1:1 to about 3:1.

Preformed Cores

Preformed core materials useful in the present invention can be envisioned as an abrasive coating substrate that can be selected or modified in its surface characteristics, mechanical properties, and environmental stability properties. The preformed core material is preferably selected or capable of being modified so that its surface has the ability to achieve adhesion between the core and thermoplastic elastomer coating. Important mechanical properties include tensile strength and flex fatigue resistance while operating under various chemical, thermal and atmospheric conditions.

Preformed cores useful in the composite abrasive filaments of the present invention include: metal wire such as stainless steel, copper, and the like; inorganic fibers such as glass and ceramic fibers; synthetic fibers, such as aramid, rayon, and the like; natural fibers such as cotton, and mixtures of these. Although continuous monofilaments may be used, preferred are stranded, cable and yarn versions of these materials. "Stranded" as used herein refers to twisted together wires while "yarn" refers to twisted together non-metallic monofilaments. Typical arrangements include 1×3, 1×7, 1×19, and 3×7 arrangements, wherein the first number refers to the number of strands or yarns and the second number refers to the number of individual monofilaments or wires twisted together in each yarn or strand. "Cable" refers to two or more strands twisted together, while "plied yarns" refers to two or more yarns twisted together, preferably having the opposite direction of twist compared with the cables (for example, if the cables are twisted together "right handed" the plied yarn may be twisted together "left handed"). Alternatively, the preformed core may be in the form of untwisted continuous wires or monofilaments. Preferred yarns include yarns of glass fibers, ceramic fibers, aramid fibers, nylon fibers, polyethylene terephthalate fibers, cotton fibers, plied version thereof, and mixtures thereof.

The diameter of the preformed core is preferably at least about 0.01 mm, more preferably ranging from about 0.1 mm to about 0.7 mm, although there is actually no upper limit to the diameter other than that imposed by currently known methods of making composite abrasive filaments.

Some commercially available preformed core materials useful in the present invention include a 1×7 stranded stainless steel of 0.305 mm outside diameter (OD) available from National Standard, Specialty Wire Division, Niles, Mich.; a continuous glass filament yarn having about 204 monofilaments, known under the order number "ECH 18 1/0 0.5Z 603-0", referred to herein as "OCF H-18", and a similar glass filament yarn having an epoxy silane pretreatment and known under the order number "ECG 75 1/2 2.8 S 603-0" referred to herein as "OCF-G75", both available from Owens-Corning Fiberglass Corporation, Toledo, Ohio; yarns of aramid fibers known under the trade designation "Kevlar" (200–3000 denier, zero twist, type 964) manufactured and sold by du Pont; and the plied yarns made of aramid, nylon, and polyester fibers having textile designations #69, #92, and #138 (the numbers referring to the weight of the plied yarn), available from Eddington Thread Manufacturing Company.

In some preferred embodiments the preformed core will be treated with a pretreatment chemical such as an adhesive or sealant, which serves to adhere the TPE to the preformed core. One group of pretreatment chemicals useful when the preformed core is glass plied yarn are the epoxy-silanes.

It is worth noting that the preformed core may be abrasive in its own right.

Abrasive Particles

Abrasive particles are preferably dispersed throughout and adhered within the hardened TPE coating. Abrasive particles useful in the composite abrasive filaments of the present invention may be individual abrasive grains or agglomerates of individual abrasive particles. Suitable agglomerated abrasive particles are described in U.S. Pat. Nos. 4,652,275 and 4,799,939, incorporated by reference herein. The abrasive particles may be of any known abrasive material commonly used in the abrasives art. Preferably, the abrasive particles have a hardness of greater than about 7 Mohs, most preferably greater than about 9 Mohs. Examples of suitable abrasive particles include individual silicon carbide abrasive particles (including refractory coated silicon carbide abrasive particles such as disclosed in U.S. Pat. No. 4,505,720), fused aluminum oxide, heat treated fused aluminum oxide, alumina zirconia (including fused alumina zirconia such as disclosed in U.S. Pat. Nos. 3,781,172; 3,891,408; and 3,893,826, commercially available form the Norton Company of Worcester, Mass., under the trade designation "NorZon"), cubic boron nitride, garnet, pumice, sand, emery, mica, corundum, quartz, diamond, boron carbide, fused alumina, sintered alumina, alpha alumina-based ceramic material (available from Minnesota Mining and Manufacturing Company (3M), St. Paul, Minn., under the trade designation "Cubitron"), such as those disclosed in U.S. Pat. Nos. 4,314,827; 4,518,397; 4,574,003; 4,744,802; 4,770,671; and 4,881,951, and combinations thereof.

The abrasive particles are preferably present in the hardened TPE coating at a weight percent (per total weight of TPE and abrasive particles) ranging from about 0.1 to about 65 weight percent, more preferably from about 3 to about 60 weight percent. The higher weight percentage of abrasive particles is roughly twice the highest amount of abrasive that can be formulated into a typical nylon abrasive filament. A typical abrasive-filled nylon filament would be limited as to the amount of abrasive particles which could be employed because typically the tensile strength and flex fatigue resistance of the abrasive-filled nylon filaments decrease with increased loading of abrasive particles.

The size of the abrasive particles incorporated into the hardened TPE coating depends on the intended use of the composite filaments. For applications requiring cutting or rough finishing, larger abrasive particles are preferred, while abrasive particles having smaller size are preferred for finishing applications. Preferably, the average diameter of the abrasive particles is no more than about ½ the diameter of the composite abrasive filament, more preferably no more than about ⅓ of the diameter of the composite abrasive filament.

The surface of the abrasive particles (or a portion of their surface, or a portion of the particles but their whole surface) may be treated with coupling agents to enhance adhesion to and dispersibility in the molten TPE. Examples of suitable coupling agents include silane, zirco-aluminate, and titanate coupling agents. Coupling agents may enhance the tensile strength of the hardened composition; this aspect is more important in abrasive filaments not having high tensile strength preformed cores, such as disclosed in assignee's co-pending application, cross-referenced above.

The abrasive particles are not required to be uniformly dispersed in the hardened composition, but a uniform dispersion may provide more consistent abrasion characteristics.

Abrasive Articles

Figure 5:
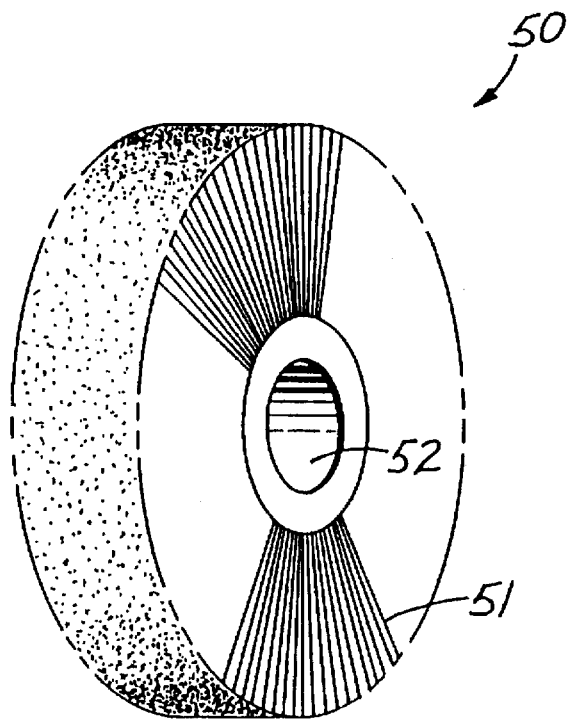
FIG. 5 shows a perspective view of one embodiment of a brush tool (in this case a rotary brush tool) incorporating composite abrasive filaments in accordance with the invention.

Composite abrasive filaments of the invention may be incorporated into a wide variety of brushes, either assembled to form an open, lofty abrasive pad, or attached to various substrates. FIG. 5 shows one embodiment of a wheel brush 50 within the invention having a plurality of composite abrasive filaments 51 glued or otherwise attached to a hub 52. A construction of such a brush is described in "Test Brush Construction II", below.

The composite abrasive filaments of the invention can be incorporated into brushes of many types and for myriad uses, such as cleaning, deburring, radiusing, imparting decorative finishes onto metal, plastic, and glass substrates, and like uses. Brush types include wheel brushes, cylinder brushes (such as printed circuit cleaning brushes), mini-grinder brushes, floor scrubbing brushes, cup brushes, end brushes, flared cup end brushes, circular flared end cup brushes, coated cup and variable trim end brushes, encapsulated end brushes, pilot bonding brushes, tube brushes of various shapes, coil spring brushes, flue cleaning brushes, chimney and duct brushes, and the like. The filaments in any one brush can of course be the same or different.

Method of Making Composite Abrasive Filaments

Composite abrasive filaments in accordance with the present invention can be made by any of a variety of processes, including passing one or more preformed cores through a die in which molten, abrasive-filled TPE is coated onto the preformed cores as they move through the die, spray coating abrasive-filled, molten TPE onto a preformed core, or by passing a preformed core through a bath of molten TPE, followed by applying abrasive particles to the molten TPE coating. (Alternatively, the abrasive particles could be in the bath of molten TPE.) Abrasive particles may be applied to a TPE-coated core by projecting the abrasive grains toward the TPE-coated preformed core by force, such as electrostatic force. However, the preferred method is the first mentioned one, wherein one or more preformed cores are passed through a die which at least partially coats the preformed cores with molten, abrasive-filled TPE, and the molten TPE cooled to form the hardened composition.

Figure 6:
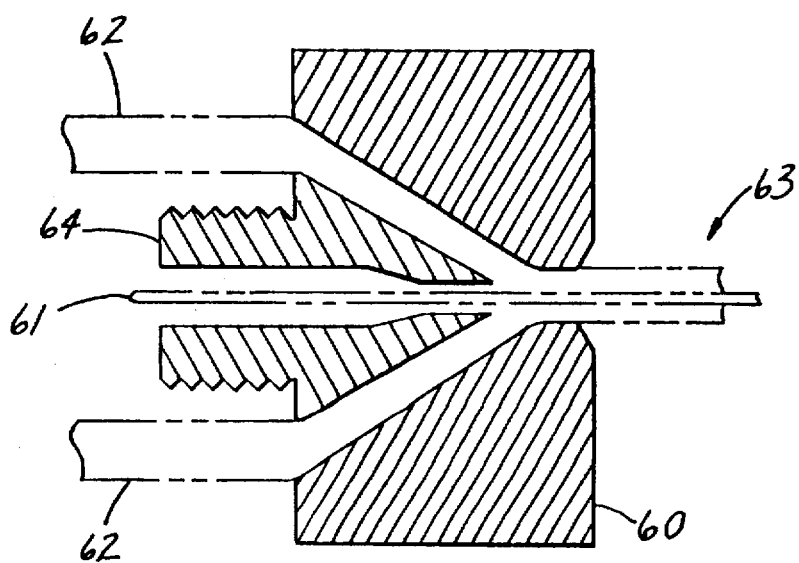
FIG. 6 is a cross-sectional view (reduced) of an extrusion die, with molten, abrasive-filled TPE and preformed core shown in phantom.
Figure 7:
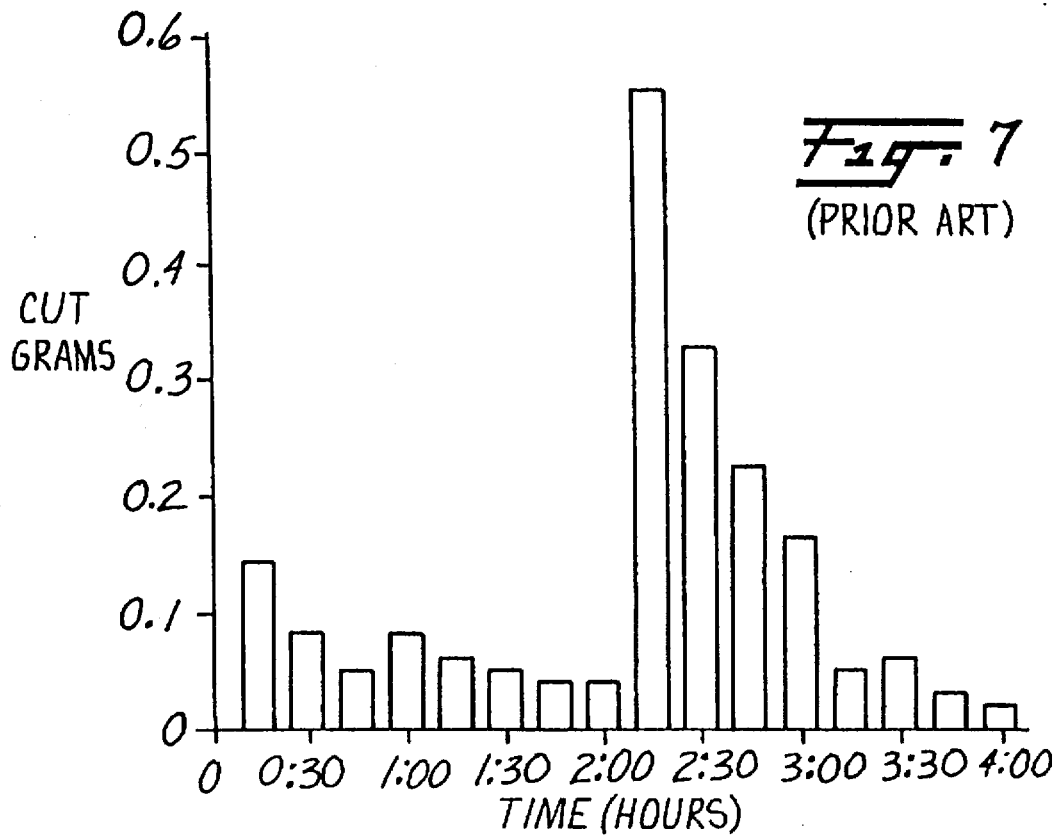
FIG. 7 is a bar graph which reveals the weight in grams removed from a workpiece (also referred to in the art as "cut") as a function of time for a rotating brush tool having a plurality of prior art nylon abrasive filaments.

In one preferred method in accordance with the invention, a die 60 such as that shown in FIG. 6 is attached to the exit of an extruder, an extruder being one preferred technique of rendering the TPE molten and mixing the abrasive particles into the molten TPE. The apparatus and method of Nungesser et al., U.S. Pat. No. 3,522,342, discussed previously, is one preferred method. FIG. 6 shows molten, abrasive-filled TPE (or abrasive-filled TPE/thermoplastic polymer blend, as desired) in phantom at 62, and a single preformed core 61, also in phantom, it being recognized by those skilled in the art that the polymer melt and preformed core flow from left to right as shown. The abrasive-filled, TPE-coated preformed core 63 exits die 60 as shown. Shown at 64 is a screw attachment for attaching the die to an extruder (not shown). Suitable modifications to die 60 may be made to pass a plurality of preformed cores, these modifications being within the skill of the artisan.

For each TPE the zone temperatures of the extruder and die temperature are preferably set at the temperatures commercially recommended for each TPE (see Table A), the main limitation being the melting or dissociation temperature of the hard domains or ionic clusters of the TPE. Preferred extruder zone and die temperatures are listed in Table A. The extruder (or other TPE melt rendering means, such as a heated vessel and the like) preferably heats the TPE above the hard domain or ionic cluster melting or dissociation temperature (which may have a range that can change with type and grade of the TPE) and pushes molten TPE through a heated die.

Abrasive particles may be added to the molten TPE through a feed port in the extruder into the molten TPE mass, preferably at point early enough to afford adequate dispersal of abrasive particles throughout the molten TPE. Alternatively, abrasive particles may be distributed in the molten TPE coating via a second step (i.e. after the preformed core has been coated with molten TPE), such as by electrostatic coating.

TABLE A[1]

| EXTRUDER ZONE AND DIE TEMPERATURES, °C. | | | | | |
|---|---|---|---|---|---|
| Extrusion Zone[2] or die TPE: | 1 | 2 | 3 | 4 | die |
| polyester | 230–250 | 230–250 | 230–250 | 230–250 | 230–250 |
| ionomers | 225–250 | 225–250 | 225–250 | 225–250 | 225–250 |
| polyether block amides | 170–230[3] | 170–230 | 170–230 | 170–230 | 170–230 |
| polyurethanes | 170–190 | 180–195 | 195–215 | 205–225 | 190–210[4] |

[1]Data from Legge, et al.
[2]"1" corresponds to first heated zone, while "4" refers to the zone preceding the die
[3]Lower temperature for lower hardness, higher temperature for higher hardness grades
[4]Higher temperature near zone 4, lower temperature near outlet of die.

A cold water quench is located immediately downstream of the die through which the molten TPE-coated preformed core passes to achieve rapid cooling of the molten TPE to form a hardened composition comprising TPE and abrasive particles on the preformed core prior to windup of the coated preformed core onto a windup roll. A process wherein multiple preformed cores are coated simultaneously may be preferably from the standpoint of mass producing composite abrasive filaments, which may be accomplished using a manifold arrangement. In this case, more than one wind up roll may be required.

Conventional dies may require a pulley mechanism having vertical and horizontal adjustments placed immediately downstream of the cold water quench to provide means for centering the preformed core in the die and provide concentric coatings. Of late, commercially available dies provide this centering function without the use of a separate mechanism. A die known under the trade name "LOVOL", available from Genca Die, Clearwater, Fla., having four helicoid fixed center arrangement, gives acceptable abrasive particle dispersion in the molten TPE, substantially concentric coatings, and is easier to rethread with preformed core material when preformed core material is changed.

The abrasive-filled TPE coating thickness may be changed using mechanical inserts into the die. Thickness of the coating may also be adjusted somewhat by the speed that the preformed core passes through the die, higher speeds yielding somewhat thinner TPE coatings. A preformed core speed of ranging from about 30 to about 100 m/min has proved preferable, more preferably from about 30 to about 45 m/min, for pilot scale operations, while production speeds may be considerably higher, such as 300 m/min in large scale operations.

The hardened, abrasive-filled TPE-coated preformed core may be cut to individual composite abrasive filaments having the desired length. There is no need to orient the filaments to increase their tensile strength prior to use.

Other methods of making the composite abrasive filaments of the present invention include injection molding, spray coating, and dipping, wherein each case the preformed core is at least partially coated with the molten TPE, and wherein the molten TPE may have abrasive particles dispersed therein or wherein the abrasive particles are applied in a second step, such as electrostatic coating.

After the molten, abrasive-filled TPE has hardened, the composite abrasive filaments may have a coating (e.g. a plastic coating) applied thereover.

It should further be understood that the hardened composition comprising TPE and abrasive particles can contain fillers, lubricants, and grinding aids in levels typically used in the abrasives art.

More detailed descriptions of the method of fabricating composite abrasive filaments and methods of abrading flat plate and flat screen workpieces, along with performance test results, are given in the Examples which follow.

EXAMPLES

The following examples are given as illustrations of the invention and are not intended as limitations thereof. In all examples, all parts and percentages are by weight unless otherwise stated. "P" refers to heat treated abrasive particles where used in conjunction with an abrasive particle designation, while the "grade" of abrasive particles refers to that used by the Grinding Wheel Institute (ANSI ASC B74.18-1984). "CRS" refers to "cold rolled steel".

TEST METHODS

Fatigue Failure Resistance

This test was used to evaluate fatigue failure of composite abrasive filaments, the results of which can be used to predict relative usable life of a brush made from the composite abrasive filaments of the invention. The test procedure used was published and described in Technical Bulletin No. 6, "Fatigue Resistance and Some of the Factors That Affect Flex Life of Brush Filling Materials", February, 1978, by du Pont, Plastic Products and Resins Department, Code #E-19743. The test procedure was followed exactly, with the exception that the filament holding device on the tester was changed to four chucks, each of which could be adjusted to firmly grasp one composite abrasive filament. In this test, the four chucks were affixed to a drive shaft, each of which was used to secure an individual composite abrasive filament or control filament. The chucks were mounted 90° apart with each being spaced 50 mm from the center of the drive shaft. The drive shaft was operated at 500 rpm. As per the test procedure, the interference between the filaments and the impact bar was adjusted, depending upon the filament diameter. For a 1.02 mm diameter filament, the interference was 12.22 mm; for 1.14 mm filament, the interference was 13.21 mm; for a 1.27 mm filament, the interference was 16.51; and for a 1.40 mm filament, the interference was adjusted to 18.16 mm. After securing four identical test filaments to the drive shaft, the drive shaft was rotated and the time required to cause 50% of the filaments to break was recorded. This value is reported in Table 4 for Examples 1–27 and Comparative Examples A–F.

Test Brush Construction I

Composite abrasive filaments were used to form abrasive brushes by attaching one end of the composite abrasive filaments to a cast aluminum, machined, two-part hub. The first part of the cast aluminum, machined hub consisted of a 5 mm thick aluminum disc having a 32 mm center hole, a 102 mm outside diameter, and had a raised square cross-sectional surface at the periphery that was raised 4 mm. The second part of the cast aluminum hub was machined from a 19 mm thick cast aluminum disc, also having a 32 mm center hole with a 102 mm outside diameter. The second part of the cast aluminum hub was machined to be 5 mm thick, with the exception of three circular raised surfaces on one side of the disc, each concentric with the center hole: an outer, an intermediate, and an inner circular raised surface, all three raised circular surfaces parallel to the disc major surfaces. The outer circular raised surface had a square cross-section of 4 mm by 4 mm and an outside edge diameter of 102 mm. The intermediate circular raised surface had an outside edge diameter of 73 mm and an inside edge diameter of 68 mm, and was raised 13 mm above the disc major surface. The annulus formed by one of the disc major surface and the intermediate raised surface was machined to produce eight equally sized and spaced bores extending radially through the annulus, each bore being 9 mm in diameter with the spacing between adjacent bores being about 3 mm. These bores defined holes into which composite abrasive filaments were subsequently placed. The inner circular, raised surface had an inside edge diameter of 32 mm which, when the two hub parts were mated, defined the center hole of the hub. The inner raised surface outer edge had a diameter (measured from the hub center) of 44 mm and was raised 13 mm above the disc major surface. The inner raised surface and intermediate raised surface of the second hub disc defined the plane against which the first hub part was placed. The raised square cross sections of the first and second hub parts opposed each other.

One end of approximately 125 to 150 composite abrasive filaments, each 83 mm long, were placed into each of the eight bores. Sufficient number of filaments were placed in each bore to essentially fill each bore. A two-part epoxy adhesive liquid resin composition (combination of the epoxy "Epi-Rez" WD-510, from Rhone-Poulenc, and the amine "Jeffamine" D-230, available from Texaco Chemical Company, Bellaire, Tex.) was placed over the filament end which protruded into the bore. The first part of the machined aluminum hub was secured to the second part using four screws, 4 mm in diameter, through four holes equally spaced 42 mm from the center of the machined aluminum hub. This caused the composite abrasive filaments to slightly fan out with a resultant filament trim length of about 50 mm. After being held for approximately 24 hours at room temperature (about 25° C., to allow the epoxy resin to harden), followed by a post cure at about 60° C. for about 1 hour, the composite abrasive filament brushes were ready for subsequent evaluations. The brushes had a 32 mm center hole and approximately 200 mm outside diameter.

Test Brush Construction II

A mold was fabricated so that composite abrasive filaments of the invention could be used to form abrasive brushes as shown in FIG. 5. A round base plate was fabricated with a 3.18 cm diameter center through hole which was adapted to accept a solid, cylindrical core piece having outer diameter slightly less than 3.18 cm. Slots were machined into one surface of the base plate to create a radial pattern so that thin metal spacers could be inserted therein. The slots extended radially, starting from a point about 5 cm from the center through hole and extending to the periphery of the plate. A right cylinder (200 mm I.D.) was then fastened to the surface of the base plate having the slots so that the hole in the base plate and the cylinder were concentric.

The spacers were then put in the slots, the solid, cylindrical core piece inserted in the through hole, and a multiplicity of composite abrasive filaments having length equal to the slot length plus about 5 cm were then aligned within the spaces left between the spacers. The spacers provided a method to uniformly and closely distribute the composite abrasive filaments radially with a predetermined length which could then be held firmly with a clamp ring, which fitted over the end of the filaments pointing toward the center through hole.

A polymeric cast hub was then formed by pouring a liquid, two-part epoxy resin (trade designation "DP-420", from 3M) into the center cavity formed between the solid, cylindrical center core piece and the clamp ring, at about 50° C. When the resin was fully cured, the brush was removed from the device and then tested in Examples 25–27 and Comparative Example F.

Flat Plate Abrasion Tests

Composite abrasive filament- containing brushes were weighed and separately mounted on a shaft connected to a 2.24 Kw (3 hp) motor which operated at 1750 rpm. 1018CRS steel plates, 100 mm square by approximately 6 mm thick, were weighed and then brought in contact with each brush with a force of 13.3 Pa. At 15 minute intervals, the test brushes and steel plates were again weighed to determine the weight loss of the steel plates and weight loss of the test brushes. After 8 test periods of 15 minutes each (120 minutes total) the tests were concluded and the total cut (steel plate weight loss) was calculated. This value was divided by 2 to give average grams cut per hour by each brush. The efficiency ($\eta$) of the brushes was calculated by dividing the total plate weight loss by the total composite abrasive filament weight loss. Results are reported in Table 4.

Perforated Screen Abrasion Tests

Brushes were tested for abrasion of perforated steel. In this test, 50×150 mm pieces of 16 gauge 1008CRS steel perforated screen having approximately 4 mm diameter staggered holes with 46% open and having stock pattern number 401, commercially available from Harrington and King Perforating Company, Inc., Chicago, Ill., were abraded, a double layer of the screen used in each test. Results are reported in Table 4.

Composite Abrasive Filament Tensile Strength

Composite abrasive filaments of the invention were evaluated for their tensile strength by measuring the force required to break a 100 mm long composite abrasive filament grasped at each end by one of two jaws of a standard tensile tester (known under the trade designation "Instron" Model TM), where the jaws were initially spaced 25 mm apart and then separated at the rate of 50 mm a minute. The force required to break each filament was noted and recorded as kilograms force required.

Composite Abrasive Filament Extrusion

Various composite abrasive in accordance with this invention were prepared by the melt extrusion process. A twin screw extruder fitted with two 30 mm diameter co-rotating screws having an L/D ratio of 30:1 (model ZSK-30, from Werner-Pfleiderer), was employed in each case. The thermoplastic elastomers employed were first rendered molten by the extruder (using zone and die temperatures in Table A above for each TPE), whereupon abrasive particles were controllably added through a feed port of the extruder barrel. Preformed cores of stainless steel, aramid fiber yarn, glass fiber yarn, depending on the Example, were pulled through an extrusion die which allowed the molten abrasive-containing TPE to be coated on the preformed cores. The extrusion die used was commercially available under the trade designation "LOVOL", from Genca Die, Clearwater, Fla. After exiting the extrusion die, the molten TPE was hardened by cooling the coated preformed core in a water stream placed about 150 mm from the face of the extrusion die, after which the abrasive-filled, TPE coated preformed core was wound onto a separate roll for each preformed core/TPE combination. Composite abrasive filaments were subsequently cut from each roll. It is important to note that none of the coated preformed cores produced by the above method required orienting prior to being accumulated on the roll, subsequent cutting into filaments, and fabrication into brush devices.

The TPEs employed, including some of their physical properties, are listed in Table 1. Table 2 lists the various preformed cores used, while Table 3 lists the example composite abrasive filaments (Examples 1–27). Table 4 lists Comparative Examples A–F, where TPE, abrasive particle type, size, etc., are tabulated. The abrasive particle content was determined by using a standard thermal burnoff technique.

Five abrasive-filled nylon control filaments A–E were used to compare with Examples 1–24, which used Test Brush Construction I, above. The composition of Comparative Example filaments A–E is indicated in Table 4. All Comparative Example filaments A–E were commercially available (under the trade designation "TYNEX") from du Pont except for Comparative Example B filament, which was commercially available from Asahi Chemical Company, Japan.

Three brushes were made using Test Brush construction II, and employing composite abrasive filaments comprising blends of polyurethane TPE and ABS terpolymer (Examples 25–27). A "control" Example F was used to verify the abrasion testing. Example F used composite abrasive filaments similar to Example 8A, differing only by employing Test Brush Construction II. The composition of Example F is listed in Table 4, although this filament is within the invention.

The results of the abrasion tests described above are presented in Table 5 for the composite abrasive filaments (Examples 1–27) made in accordance with this invention, while Table 6 lists abrasion results for Comparative Example filaments A–F.

TABLE 1

| TPE | Manufacturer | Shore D Hardness | Tensile Strength | Melt % Ultimate Elongation | Extrusion Temperature |
|---|---|---|---|---|---|
| "Hytrel 6356", a polyester TPE | du Pont | 63 | 39.3 (MPa) | 350 | 270° C. |
| "Hytrel 5556" | du Pont | 55 | 37.9 | 450 | 270 |
| "Hytrel 7246" | du Pont | 72 | 39.3 | 350 | 270 |
| "Surlyn 8550", an ionomer of ethylene and methacrylic acid partial sodium salt | du Pont | 60 | 22.6 | 420 | 250 |
| "Pebax 5500" a polyamide TPE | Atochem Group of Elf Aquitaine | 55 | 44 | 455 | 270 |
| "Pebax 6300" | Atochem Group of Elf Aquitaine | 63 | 51 | 380 | 270 |
| "Pebax 7000" | Atochem Group of Elf Aquitaine | 70 | ~60 | ~250 | 270 |
| "Estane 58409", a polyester polyurethane TPE | B. F. Goodrich | 48 | 48.2 | 470 | 220 |
| "Estane 58810", a polyether polyurethane TPE | B. F. Goodrich | 42 | 44 | 590 | 220 |
| "Prevail 3050", a polyurethane/ABS blend | Dow Chemical | 62 | 35 | 300 | 230 |
| "Prevail 3100" | Dow Chemical | 67 | 28 | 200 | 230 |
| "Prevail 3150" | Dow Chemical | 71 | 28 | 180 | 230 |

TABLE 2

| Performed Core | Designation in Table 3 | Diameter, mm | Manufacturer/Supplier |
|---|---|---|---|
| 1 × 7 7-wire strand of type 302 stainless steel | SS-T302 | 0.305 | National Standard, Specialty Wire Division, Niles, MI |
| continuous glass filament yarn having 204 filaments | Glass H-18 | 0.305 | Owens-Corning Fiberglass Corp., Toledo, OH |
| continuous glass filament plied yarn having 204 filaments, having an epoxy silane pretreatment | OCF G75 PY | 0.305 | Owens-Corning Fiberglass Corp., Toledo, OH |
| plied yarn made from an aramid polymer fiber known as "Kevlar" (du Pont) | Devlar #92 | 0.305 | Eddington Thread Mfg. Co., Bensalem, PA |
| plied yarn made of polyethylene terephthalate polyester | PET #138 | 0.381 | Eddington Thread Mfg. Co., Bensalem, PA |
| continuous filament stranded yarn made of an aramid polymer fiber known as "Kevlar 29" (du Pont) | Kevlar 400 D | 0.203 | Eddington Thread Mfg. Co., Bensalem, PA |

TABLE 3

| Example | TPE Coating | Abrasive* Particulate | Core Material | Composite Filament Diameter (mm) | Weight % Abrasive in coating |
|---|---|---|---|---|---|
| 1 | "Hytrel 5556" | P120 Al$_2$O$_3$ | SS-T302 | 1.09 | 54 |
| 2 | "Hytrel 6356" | " | " | 1.37 | 58 |
| 3 | "Hytrel 7246" | " | " | 1.22 | 59 |
| 4 | "Hytrel 6356" | " | " | 1.19 | 33 |
| 5 | " | " | " | 1.32 | 50 |
| 6 | " | 120 SiC | " | 1.27 | 39 |
| 7 | "Hytrel 7246" | 120B Al$_2$O$_3$ | OCF G75 PY | 1.19 | 39 |
| 7A | "Hytrel 6356" | " | " | 1.14 | 53 |
| 8 | "Hytrel 7246" | P120 Al$_2$O$_3$ | " | 1.14 | 42 |
| 8A | "Hytrel 6356" | " | " | 1.14 | 60 |
| 9 | "Hytrel 7246" | 120 alpha-Al cer. | " | 1.17 | 44 |
| 9A | "Hytrel 6356" | " | " | 1.14 | 47.5 |
| 10 | "Hytrel 5556" | 320 SiC | " | 0.81 | 40 |
| 11 | " | 320 Al$_2$O$_3$ | " | 0.83 | 35–40 |
| 12 | "Hytrel 5556" | 220 SiC | OCF G75 PY | 0.83 | 35–40 |
| 13 | " | 220 Al$_2$O$_3$ | " | 0.83 | 35–40 |
| 14 | "Pebax 5500" | P120 Al$_2$O$_3$ | OCF G75 PY | 1.22 | 47 |
| 15 | "Pebax 6300" | " | " | 1.14 | 42 |
| 16 | "Pebax 7000" | " | " | 1.06 | 49 |
| 17 | "Hytrel 5556" (+10 wt/5 glass fiber) | 120 SiC | " | 1.14 | 30–40 |
| 17A | "Hytrel 5556" | P120 Al$_2$O$_3$ | " | 1.14 | 30–40 |
| 17B | "Hytrel 7246" | " | " | 1.14 | 30–40 |
| 18 | "Estane 58409" | " | " | — | 41 |
| 19 | "Estane 58810" | " | " | — | — |
| 20 | " | 120 SiC | " | — | — |
| 21 | " | P120 Al$_2$O$_3$ | Kevlar 92 | 1.57 | 41 |
| 22 | "Surlyn 8550" | " | SS-T302 | 1.39 | 35–40 |
| 23 | "Hytrel 6356" (+5 wt % zinc stearate) | " | " | — | 38 |
| 24 | "Hytrel 6356" | " | copper, 1 × 7 | 1.32 | 51 |
| 25 | "Prevail 3050" | " | OCF G75 PY | 1.22 | 40 |
| 26 | "Prevail 3100" | " | " | 1.22 | 40 |
| 27 | "Prevail 3150" | " | " | 1.22 | 40 |

*Alpha-numeric preceding chemical formula refers to abrasive particle average grain size

TABLE 4

| Example | TPE Coating | Abraseive* Particulate | Core Material | Composite Filament Diameter (mm) | Weight % Abrasive in coating |
|---|---|---|---|---|---|
| A | Nylon 6,12 | 120 Al$_2$O$_3$ | — | 1.27 | 40 |
| B | " | 100 Al$_2$O$_3$ | — | 1.09 | 30 |
| C | " | 120 SiC | — | 0.56 | 30 |
| D | " | 180 SiC | — | 1.27 | 30 |
| E | " | 320 SiC | — | 1.27 | 30 |
| F | "Hytrel 6356" | P120 Al$_2$O$_3$ | OCF G75 PY | 1.27 | 40 |

*Alpha-numeric preceding chemical formula refers to abrasive particle average grain size.

TABLE 5

| Example | Abrasion Test, Plate (gm/hr) | | | Abrasion Test, Screen | | | Fatigue Resistance | |
|---|---|---|---|---|---|---|---|---|
| | Cut | Brush Loss | η* | Cut | Brush Loss | η* | 50% Failure, min | Force to Break, kg |
| 1 | 1.55 | 1.33 | 1.16 | 1.00 | 2.48 | 0.4 | >120 | 12.9 |
| 2 | 1.47 | 0.47 | 3.12 | 8.78 | 0.57 | 15.5 | 32 | 14.4 |
| 3 | 4.80 | 0.71 | 6.76 | 9.36 | 2.48 | 3.77 | 14 | 14.0 |
| 4 | 1.07 | 0.35 | 3.06 | 5.31 | 0.38 | 14 | >120 | 13.8 |
| 5 | 1.62 | 0.59 | 2.75 | 8.04 | 0.89 | 8.99 | 79 | — |
| 6 | 1.25 | 0.30 | 4.16 | 2.25 | 0.22 | 10.5 | 70 | 12.9 |
| 7 | 1.24 | 0.50 | 2.47 | 5.78 | 0.37 | 15.6 | <1 | 10.9 |
| 7A | 1.08 | 0.68 | 1.58 | — | — | — | <1 | 5.86 |
| 8 | 2.11 | 0.48 | 4.4 | 9.34 | 0.61 | 15.3 | <1 | 10.8 |

TABLE 5-continued

| Example | Abrasion Test, Plate (gm/hr) | | | Abrasion Test, Screen | | | Fatigue Resistance 50% Failure, min | Force to Break, kg |
|---|---|---|---|---|---|---|---|---|
| | Cut | Brush Loss | η* | Cut | Brush Loss | η* | | |
| 8A | 1.81 | 0.39 | 4.65 | 9.89 | 3.43 | 2.88 | <1 | 8.73 |
| 9 | 3.53 | 0.54 | 6.5 | 10.23 | 1.24 | 8.25 | <1 | 9.9 |
| 9A | 2.73 | 0.4 | 6.83 | 8.5 | 1.12 | 7.58 | <1 | 9.54 |
| 10–13 | (Dynamic test results shown in FIGS. 17–20, at constant amperage) | | | | | | | |
| 14 | 0.65 | 0.56 | 1.16 | 3.52 | 1.15 | 3.06 | >120 | 7.7–9.1 |
| 15 | 0.43 | 0.56 | 0.77 | 3.86 | 1.33 | 2.90 | >120 | 8.45 |
| 16 | 0.46 | 0.63 | 0.73 | 4.33 | 1.62 | 2.67 | <2 | 8.09 |
| 17 | 0.77 | 0.33 | 2.32 | 3.18 | 1.34 | 2.37 | <2 | — |
| 17A | 0.99 | 0.57 | 1.74 | 6.91 | 2.12 | 3.26 | <1 | — |
| 17B | 1.47 | 0.53 | 2.77 | 6.86 | 1.46 | 4.7 | <1 | — |
| 18–20 | (dynamic test results shown in FIGS. 23–24) | | | | | | | |
| 21 | 1.35 | 0.6 | 2.23 | 5.5 | 4.5 | 1.25 | >120 | 7.41 |
| 22 | 0.29 | 0.32 | 0.91 | 1.81 | 1.22 | 1.49 | 54 | 10.5 |
| 23 | 1.42 | 1.41 | 1.0 | — | — | — | — | 14.7 |
| 24 | 1.22 | 0.46 | 2.65 | 7.53 | 0.9 | 8.36 | — | 2.77 |
| 25 | 1.60 | 0.17 | 9.41 | — | — | — | — | — |
| 26 | 3.37 | 1.10 | 3.37 | — | — | — | — | — |
| 27 | 2.12 | 0.35 | 6.06 | — | — | — | — | — |

*η = Efficiency = difference between initial and final weight of workpiece divided by the difference between initial and final weight of brush.

TABLE 6

| Example | Abrasion Test, Plate | | | Abrasion Test, Screen | | | Fatigue Resistance 50% Failure, min | Force to Break, kg |
|---|---|---|---|---|---|---|---|---|
| | Cut | Brush Loss | η* | cut | brush loss | η* | | |
| A | 0.27 | 2.31 | 0.17 | 2.33 | 0.66 | 3.53 | 12 | — |
| B | 0.65 | 1.02 | 0.63 | 4.18 | 1.78 | 2.35 | — | — |
| C | 0.31 | 0.92 | 0.34 | 3.11 | 1.68 | 1.85 | — | — |
| D | 0.11 | 0.37 | 0.29 | — | — | — | — | — |
| E | 0.55 | 0.36 | 1.52 | — | — | — | — | — |
| F | 3.95 | 0.23 | 17.2 | — | — | — | — | — |

*η = Efficiency = difference between initial and final weight of workpiece divided by the difference between initial and final weight of brush.

Discussion of Results

Figure 8:
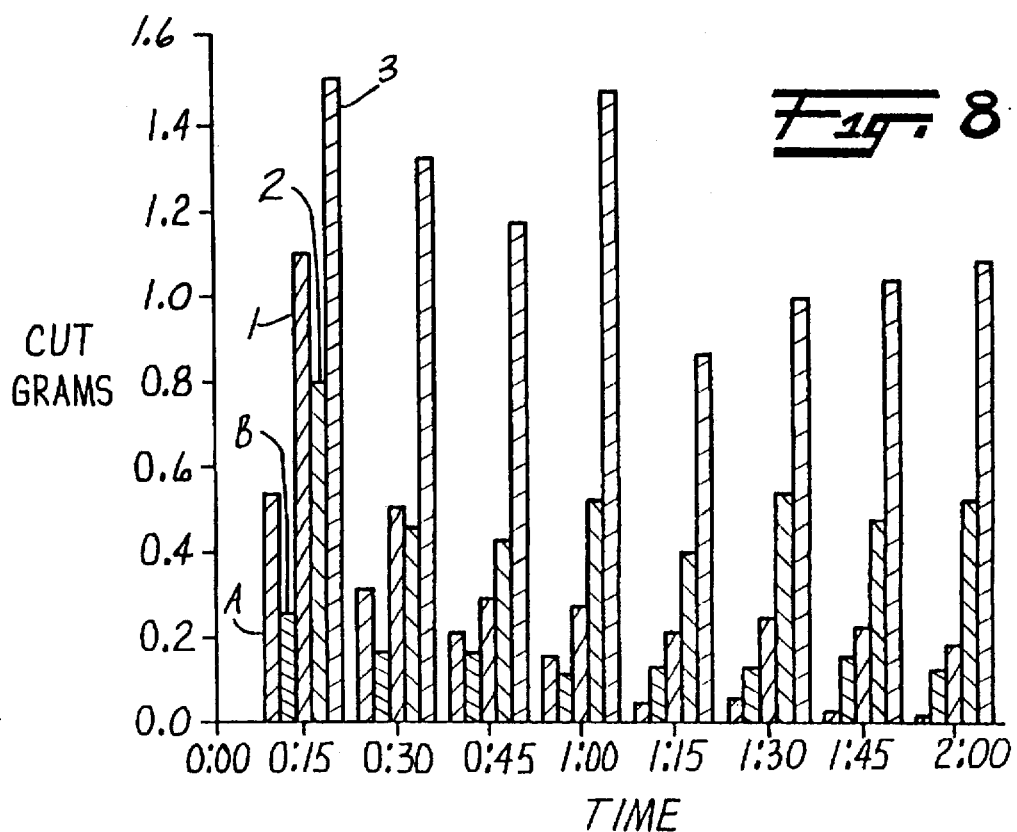
FIGS. 8, 11, 13, 15, 21 and 23 are bar graphs showing test results comparing the amount of 1018 steel plate removed as a function of time by brushes employing prior art nylon abrasive filaments with brushes employing composite abrasive filaments in accordance with the present invention.
Figure 9:
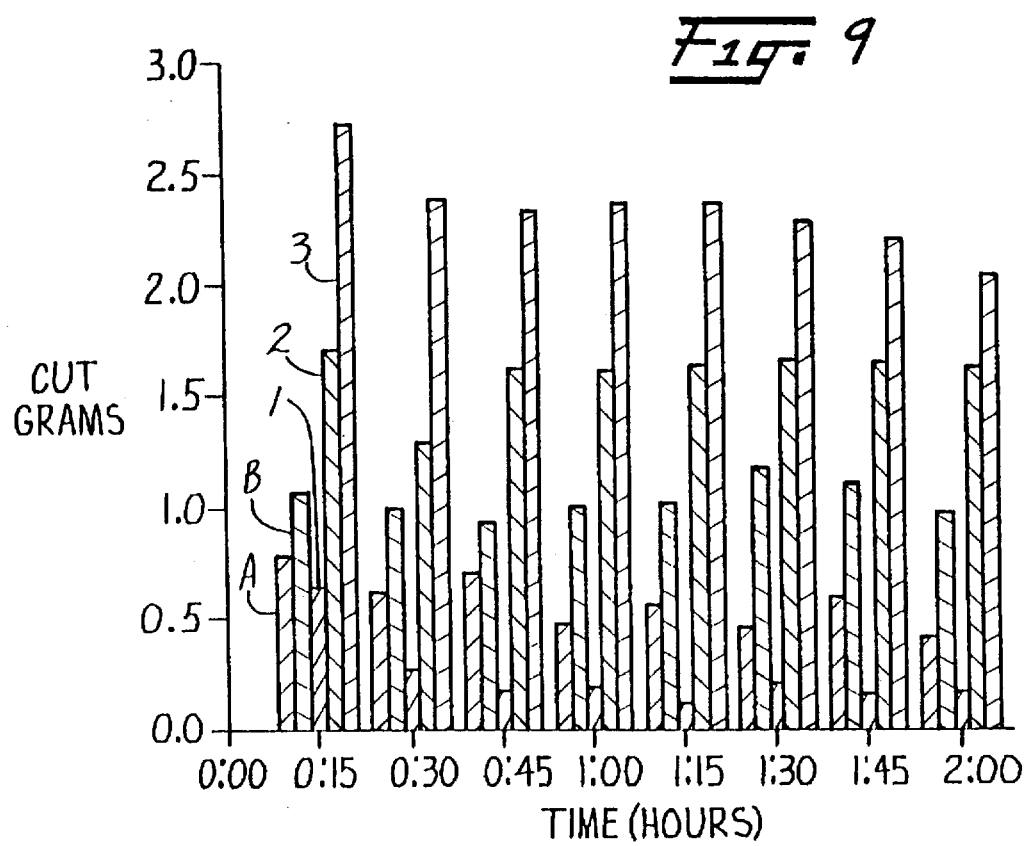
FIGS. 9, 12, 14, 16, 22 and 24 are bar graphs similar to FIGS. 8, 11, 13, 15, 21, and 23, respectively, comparing the amount of 1008 steel perforated screen removed.

FIG. 8 shows, in bar graph form, the results of workpiece removed as a function of time tests for comparative Examples A and B and Examples 1–3 of the present invention. It is clear that abrasive filament Example A (abrasive-filled nylon, known under the trade name "TYNEX") starts cutting well, but dulls rapidly to less than 5% of its original cutting ability within 1 hour under these test conditions. Comparative Example B (abrasive-filled nylon, known under the trade name "ASAHI") performed better, but not as well as the composite abrasive filaments of Examples 1–3, which started at a higher level (grams) of cut and retained their cutting abilities significantly better than the comparative Examples. This is apparent on flat 1018 CRS plate abrasion tests (FIG. 8) and perforated screen 1008 CRS abrasion tests (FIG. 9). The polyester TPE composite abrasive filaments employing TPEs with higher Shore D durometers showed more aggressive abrasive cutting action on both plate and screen.

Fatigue resistance test results (Table 4) showed that abrasive-filled nylon filaments (Example A) exceeded their limits in 10–15 minutes. The softer, polyester TPE-coated composite abrasive filaments (Examples 1 and 4) remained usable greater than 2 hours, while the hardest polyester-coated composite abrasive filaments (Examples 3, 7–9) were usable only for very short times. The best balance of fatigue resistance and abrasive cut on both steel plate and screen using polyester TPE-coated composite abrasive filaments was obtained with the polyester TPE having Shore D durometer of 63.

Figure 10:
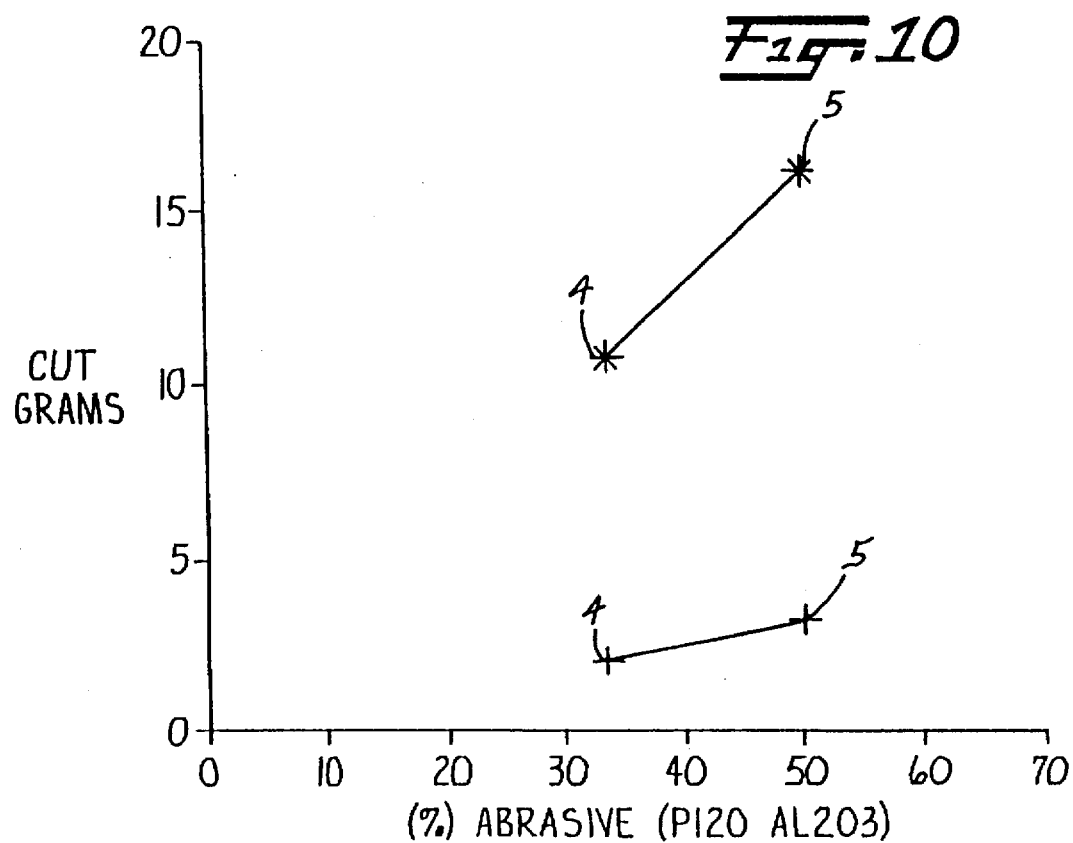
FIG. 10 is a graph which shows the effect of increased abrasive loading in TPE coatings of the composite abrasive filaments of the invention on the ability of rotating brushes incorporating same to abrade steel plate and screen.

FIG. 10 shows that cutting ability of the composite abrasive filament of Example 4 (33% abrasive) is less than Example 5 (50% abrasive) on both 1018 CRS plate (+) and 1008 CRS screen (*). It appears that the composite abrasive filaments allow higher abrasive loading and hence greater amount of workpiece removed.

Figure 11:
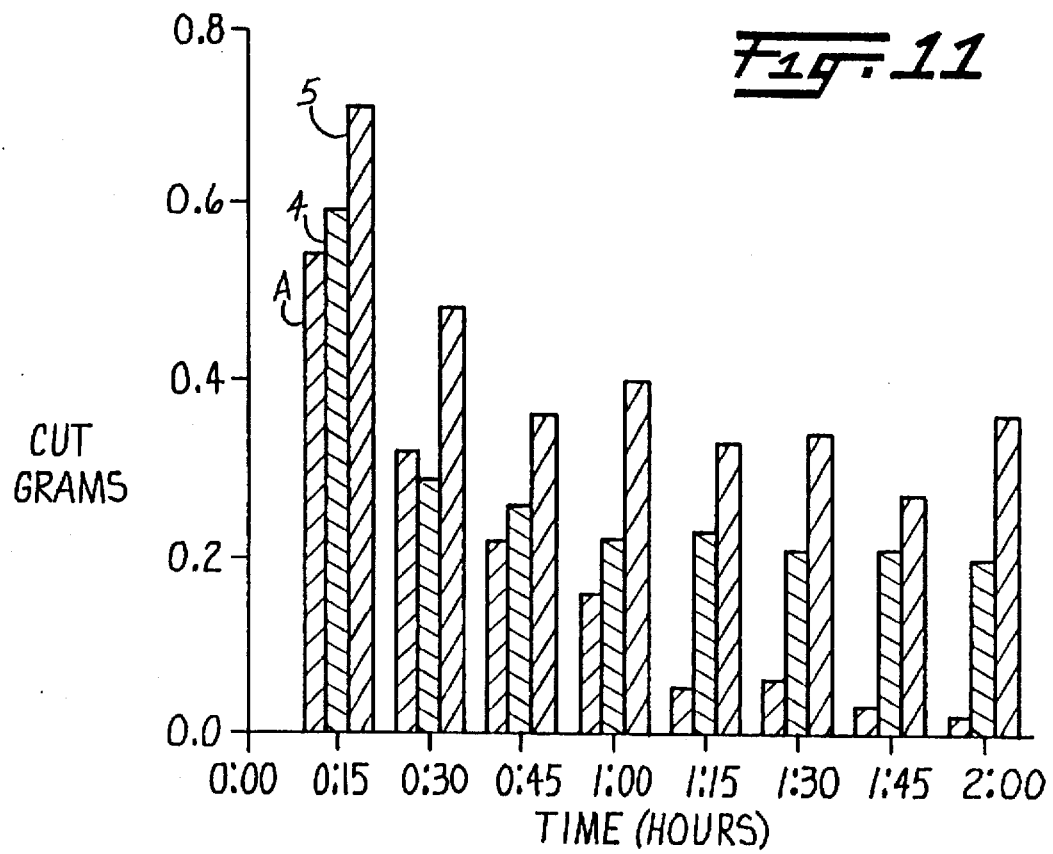
Figure 12:
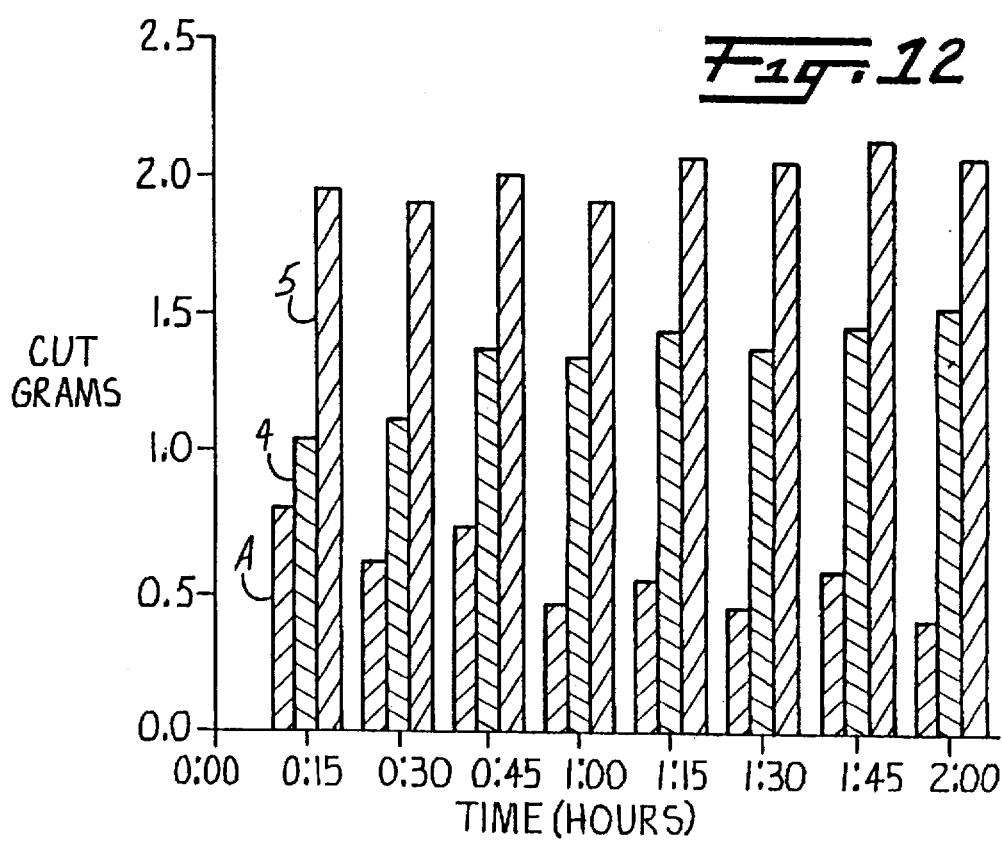

FIGS. 11 and 12 compare the results of cutting vs. time for Examples A, 4, and 5, on both 1018 CRS plate and 1008 CRS screen, showing that the composite abrasive filaments significantly out perform the abrasive-filled nylon abrasive filament to a greater degree with higher percent abrasive loading.

Figure 13:
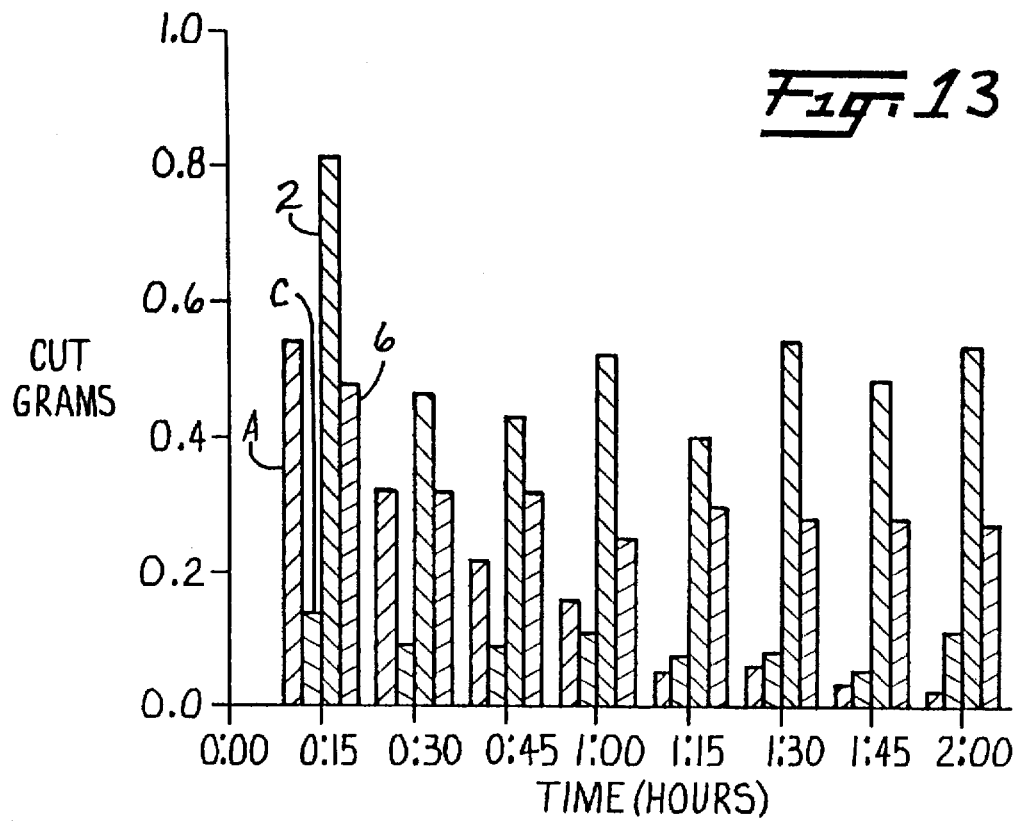
Figure 14:
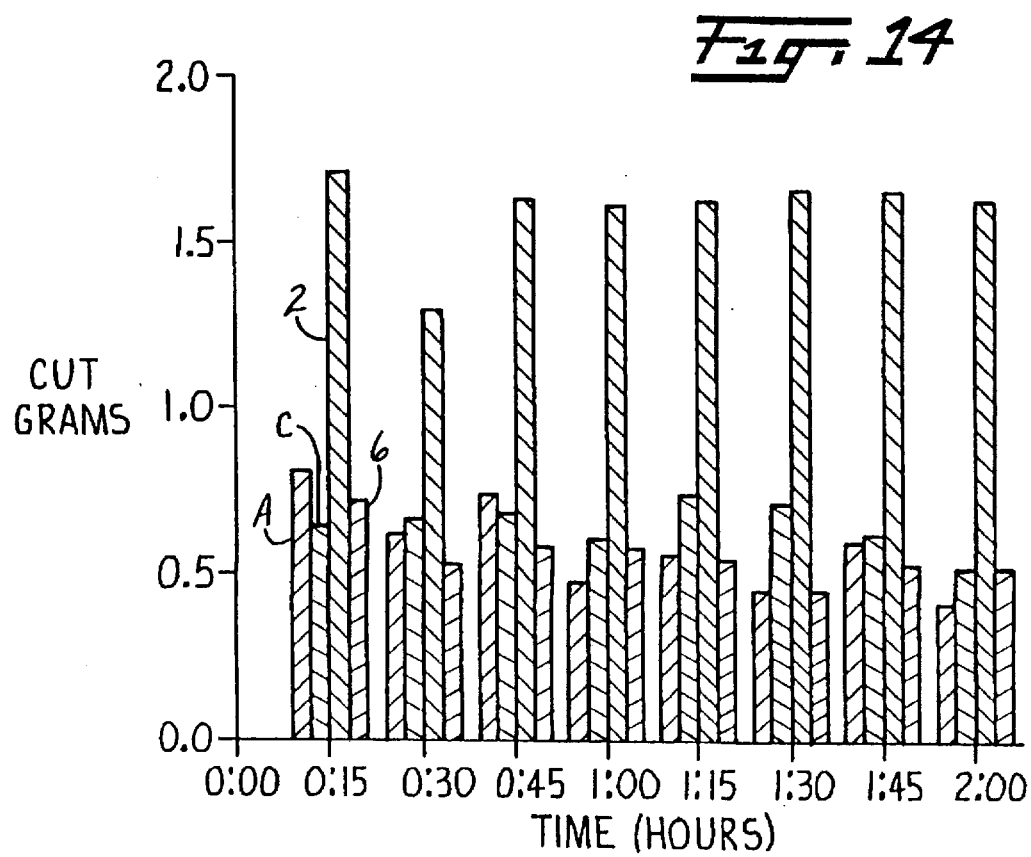
Figure 15:
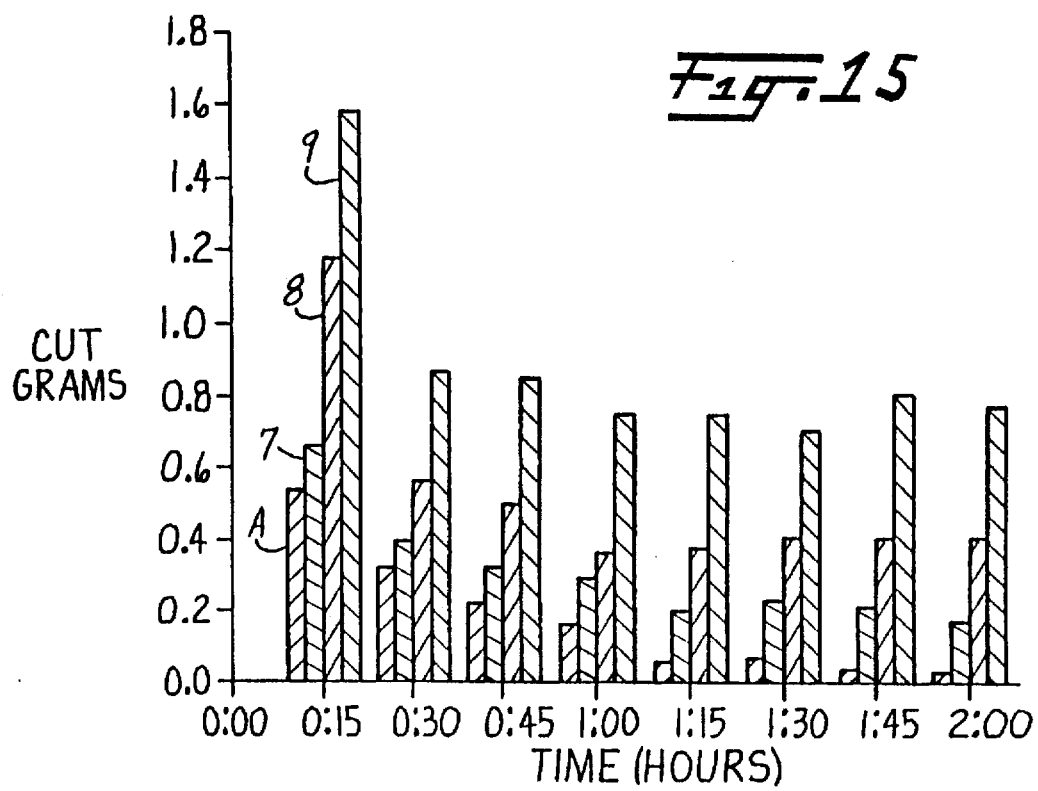
Figure 16:
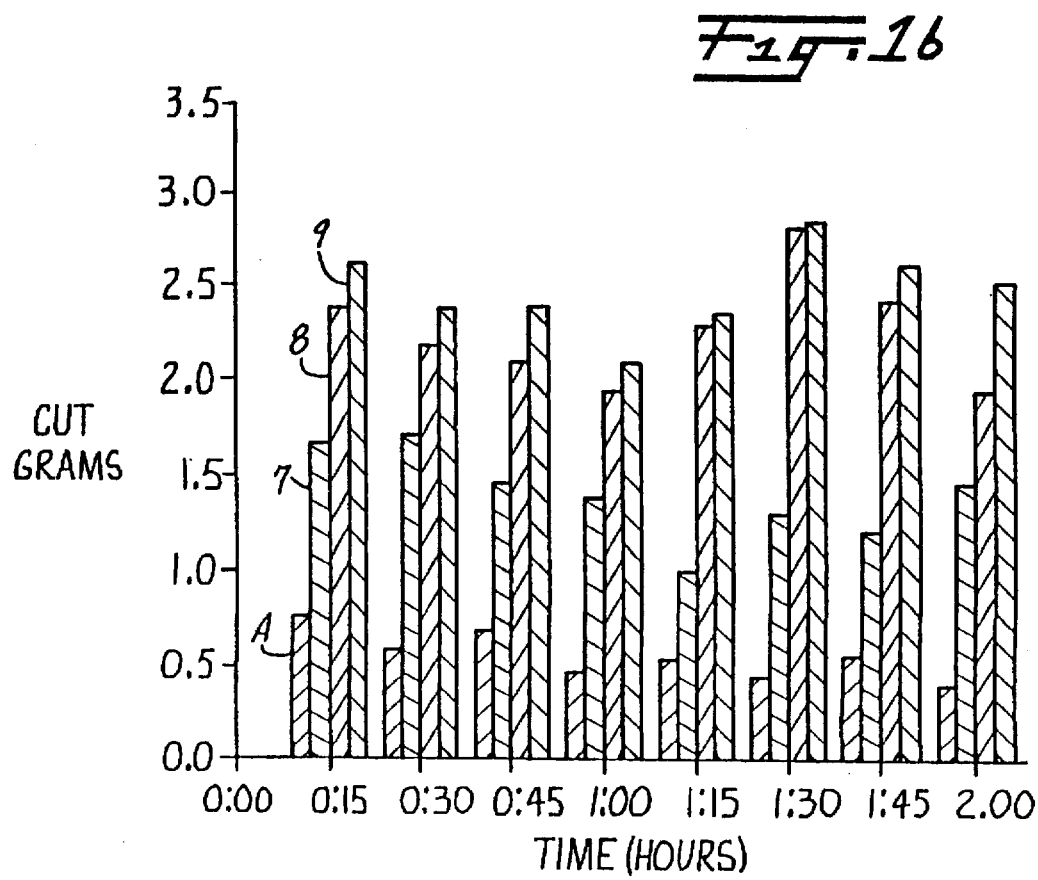

FIGS. 13 and 14 compare cutting performance of abrasive filaments A, C, 2 and 6 of Table 3. With abrasive-filled polyester TPE-coated, stainless steel preformed core composite abrasive filaments, aluminum oxide abrasive-containing composite abrasive filaments of the invention were more aggressive than silicon carbide abrasive-containing composite abrasive filaments on both 1018 CRS plate and 1008 CRS screen. A second set of composite filaments were prepared with fused aluminum oxide abrasive grains, heat treated aluminum oxide abrasive grains, and ceramic aluminum abrasive grains (the latter known under the trade designation "Cubitron") in Examples A, 7–9. FIGS. 15 and 16 show the results of abrasion tests on similar steel plate and screen, respectively. In Examples 7–9, glass plied yarn preformed cores were coated with abrasive-filled 72 Shore D durometer polyester TPE known under the trade designation "Hytrel 7246." From experiments with abrasive-filled nylon filaments, it was not expected that there would be any significant difference in abrasive cut between aluminum oxide or silicon carbide-filled thermoplastic elastomers coated composite abrasive filaments of the invention. However, quite surprisingly, the aluminum oxide and silicon carbide abrasive-filled composite abrasive filaments gave two to four times better cut than aluminum oxide-filled nylon abrasive filaments on flat plate (compare FIGS. 13 and 15), and the heat treated aluminum oxide-filled composite abrasive filaments of the invention performed significantly better on screen (FIGS. 14, 16). FIGS. 15 and 16 show that abrasive action can be significantly increased using the composite abrasive filaments of the invention when better grades of abrasives are employed.

Figure 17:
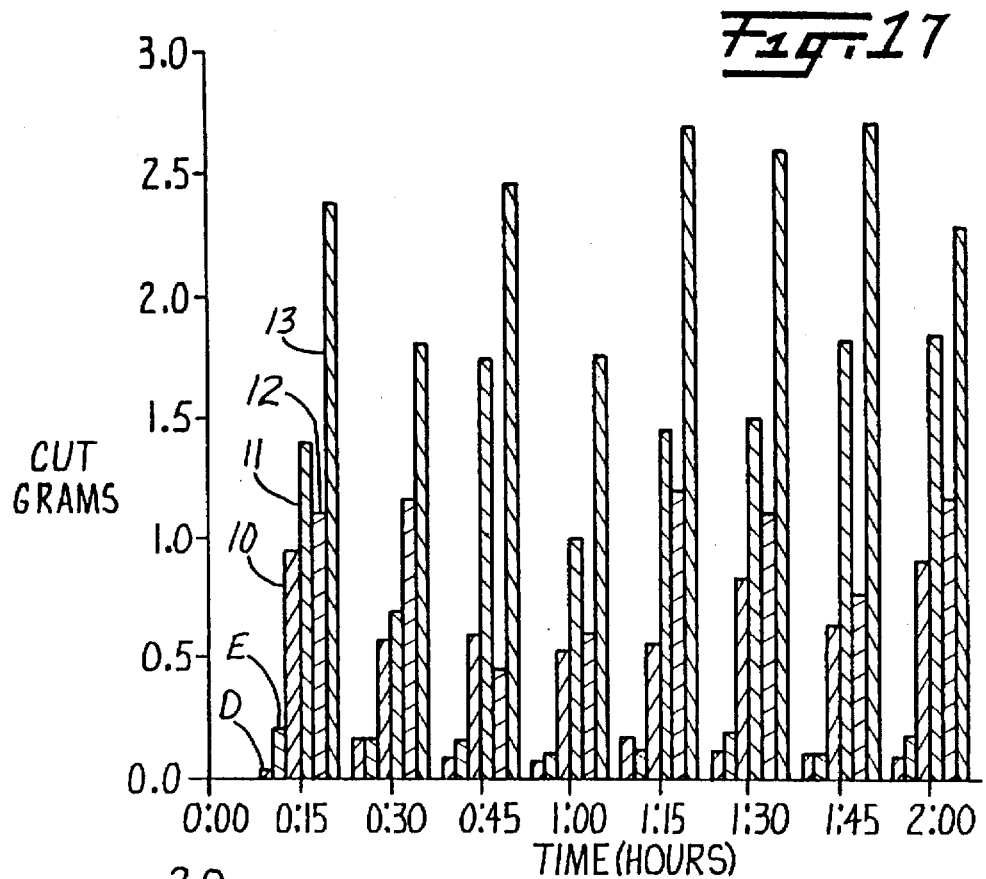
FIGS. 17–20 are bar graphs which show comparative abrasion test results of rotating brushes which include composite abrasive filaments of the invention in brushes, the filaments having various types of abrasive particles in the hardened composition.
Figure 18:
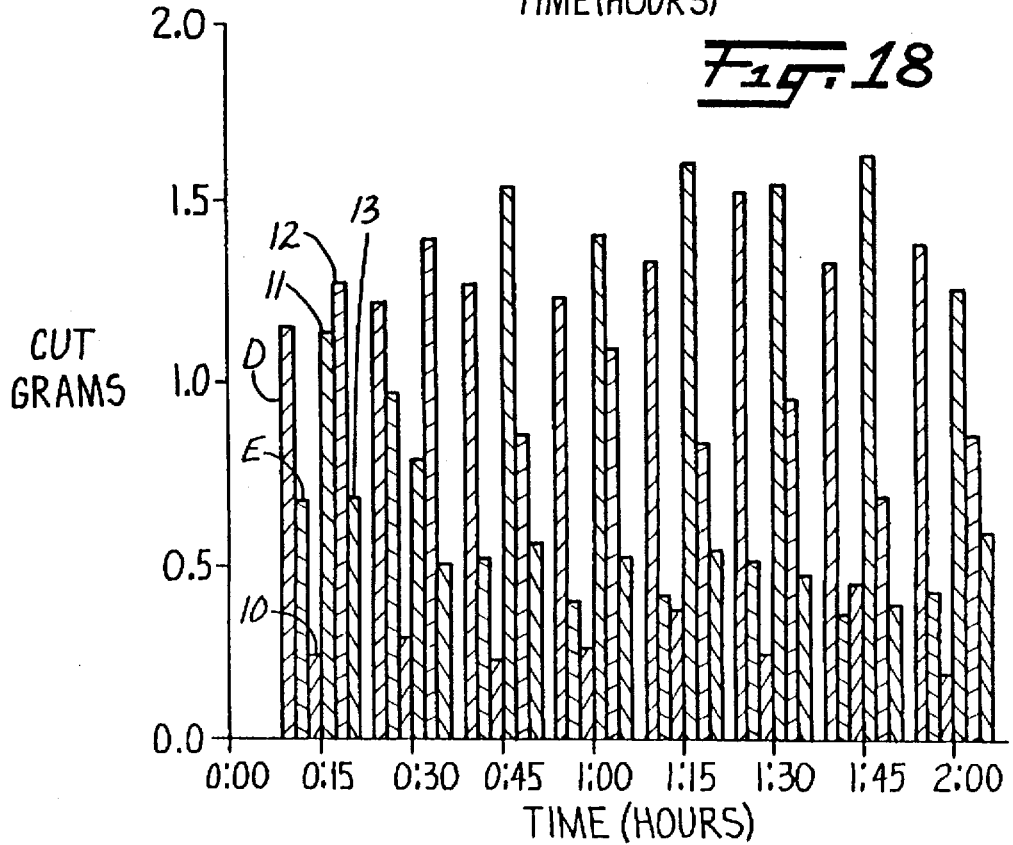
Figure 19:
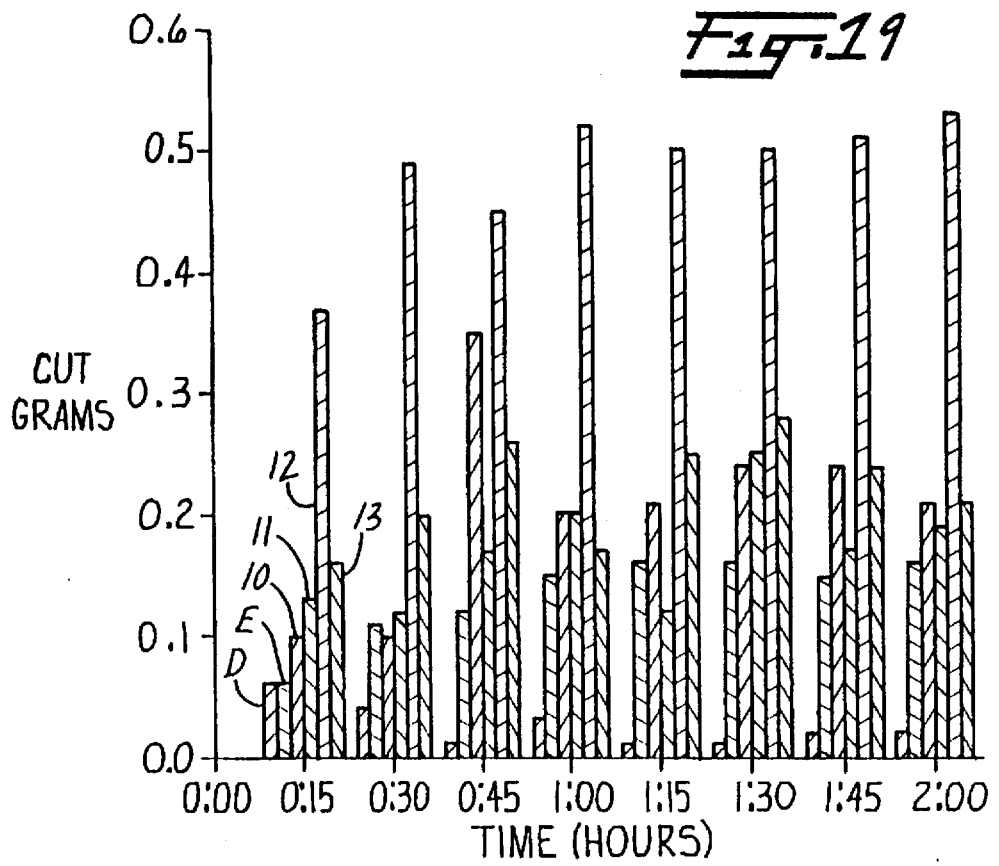
Figure 20:
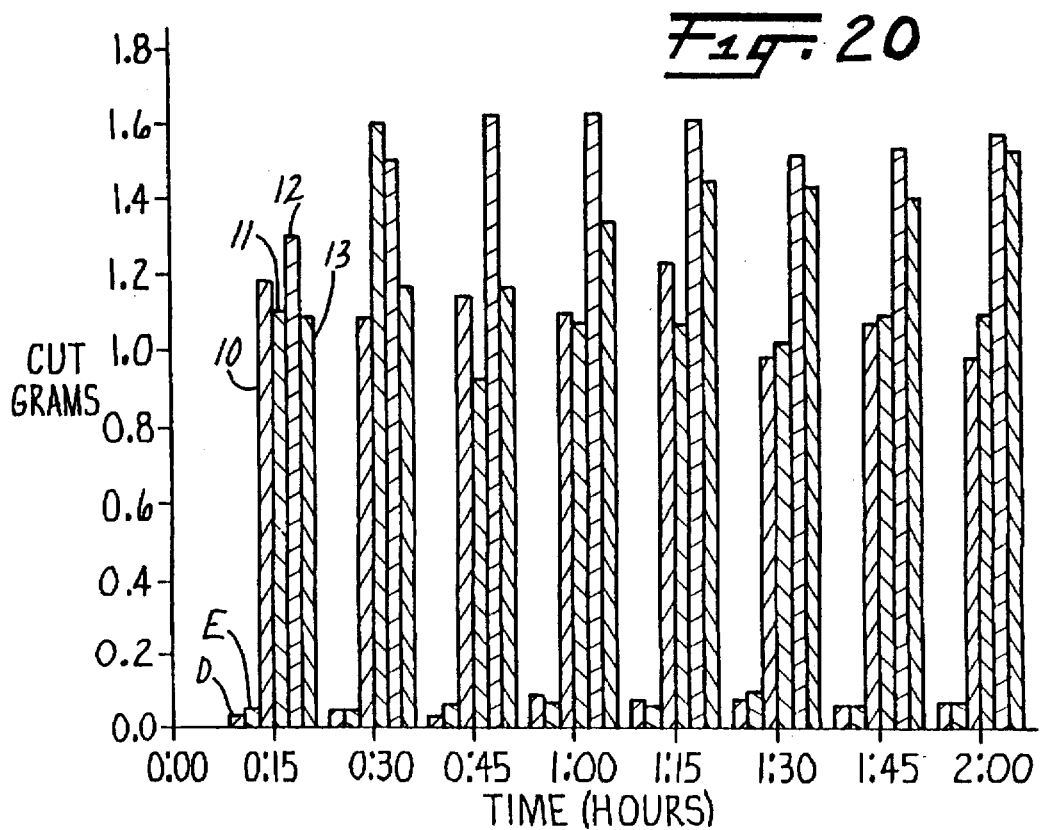

FIGS. 17–20 present, in bar graph form, comparative abrasion tests using filament Examples D, E, and 10–13 to compare the performance of filaments employing P320 and P220 aluminum oxide and silicon carbide abrasive particles. In each of Examples 10–13 the segmented polyester TPE known under the trade name "Hytrel 6356" was coated over glass yarn known under the product code "OCF G75 PY" available from Owens Corning. FIG. 17 presents test results for the filaments abrading copper plate, while FIGS. 18–20 present test results for filaments abrading titanium, 304 stainless steel, and aluminum 6061 T6, respectively.

These data show that marked differences in abrasive performance resulted when a variety of workpieces were abraded. Composite abrasive filaments employing 320 grade silicon carbide exhibited low cut whereas both grades of aluminum oxide showed much higher cut on copper.

Titanium proved to be an unusual metal workpiece. Silicon carbide and aluminum oxide abrasive particles employed in the control abrasive-filled nylon filaments exhibited the greatest cut values on this metal.

On 304 stainless steel workpieces, the results were remarkably different. The commercially available abrasive-filled nylon filaments were relatively ineffective, whereas composite abrasive filaments of the invention employing the same abrasive particles in the segmented polyester TPE known under the trade designation "Hytrel 6356" were much more effective.

Finally, a very unexpected result was obtained when T6061 aluminum workpieces were abraded. Composite abrasive filaments containing alternately silicon carbide and aluminum oxide abrasive particles, in both 220 and 320 grades, remarkably outperformed commercially available abrasive-filled nylon filaments.

Figure 21:
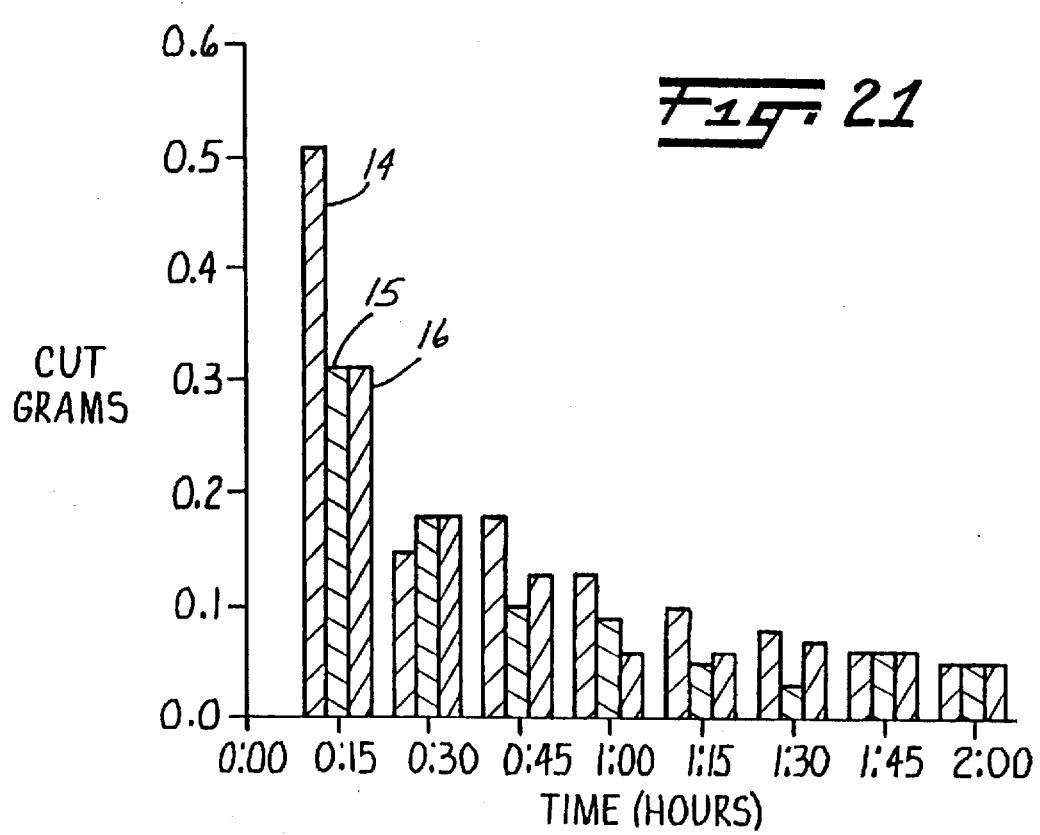
Figure 22:
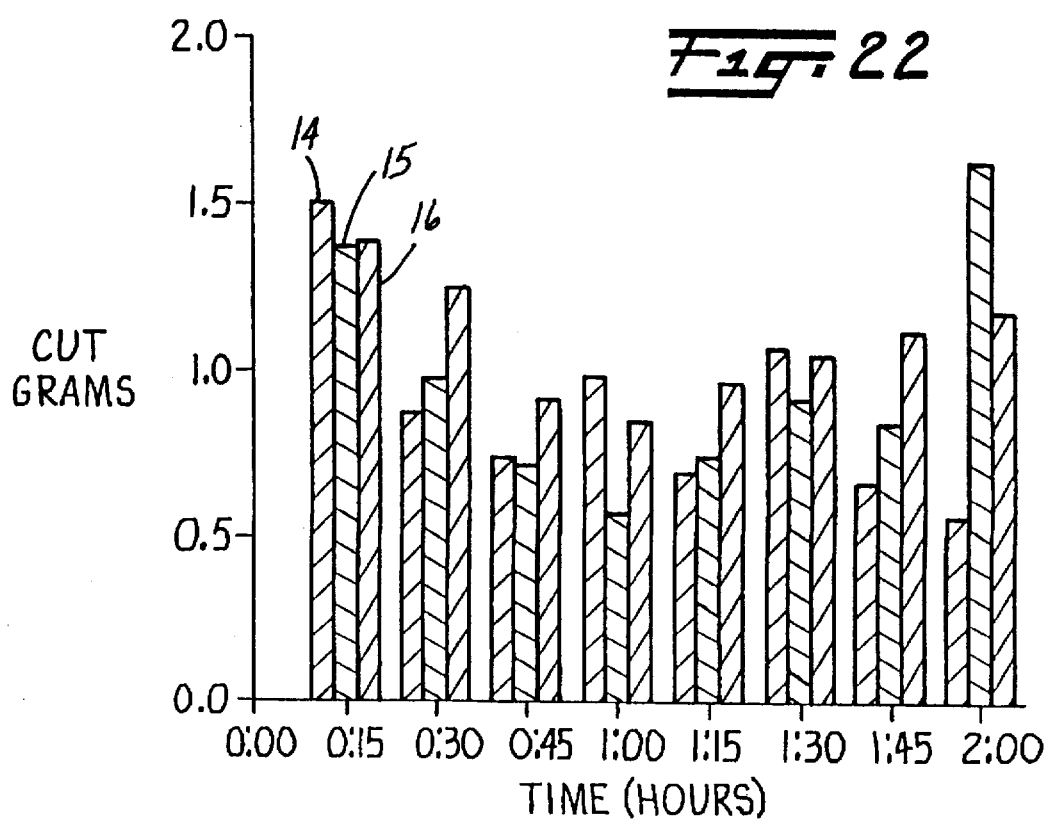

FIGS. 21–22 represent, in bar graph form, the results of abrasion tests on 1018 CRS steel plate (FIG. 21) and 1008 CRS steel screen (FIG. 22), respectively, for Example composite abrasive filaments 14–16. These examples utilized P120 aluminum oxide abrasive-filled polyamide TPE coatings on glass plied yarn preformed cores. FIG. 21 shows that these filaments were not as aggressive on steel plate, but were quite aggressive on steel screen (FIG. 22).

Figure 23:
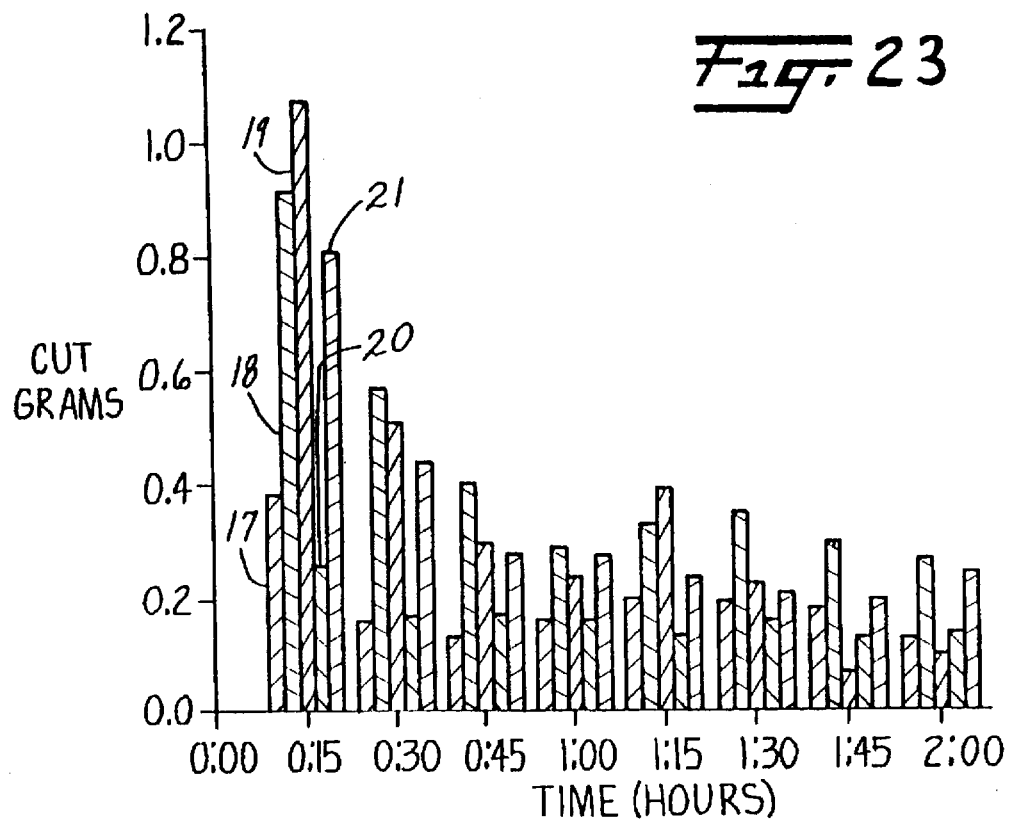
Figure 24:
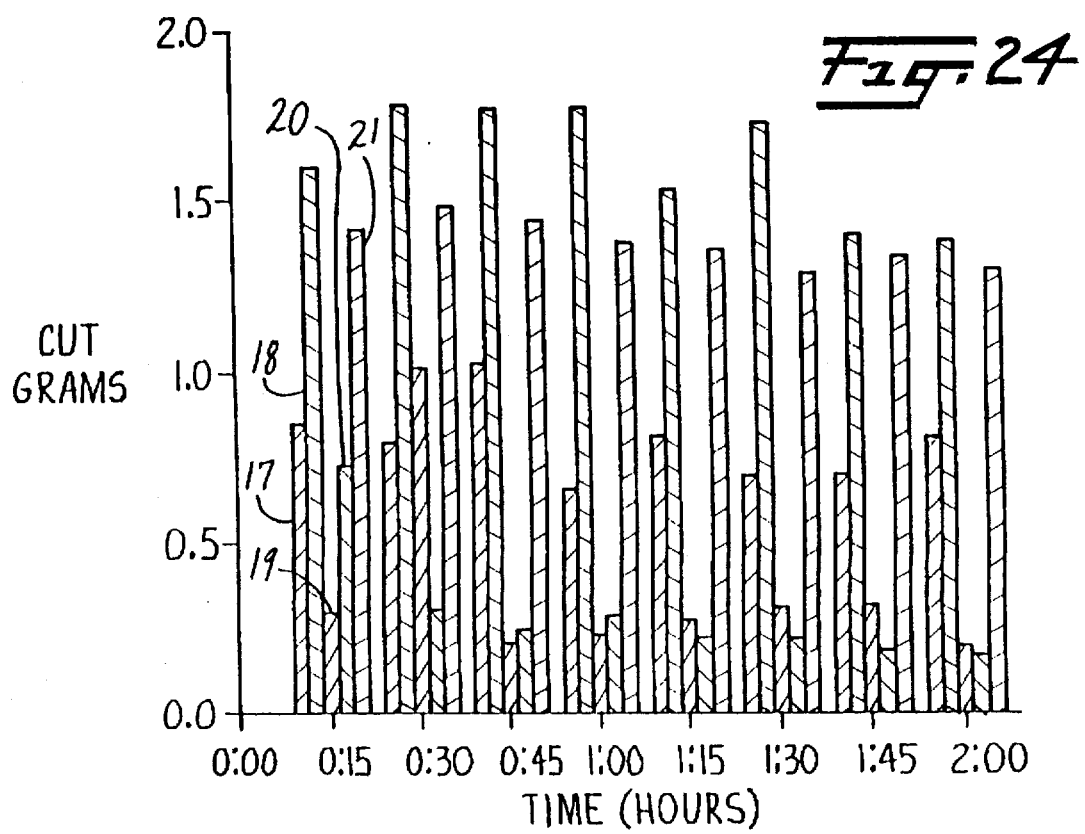
Figure 25:
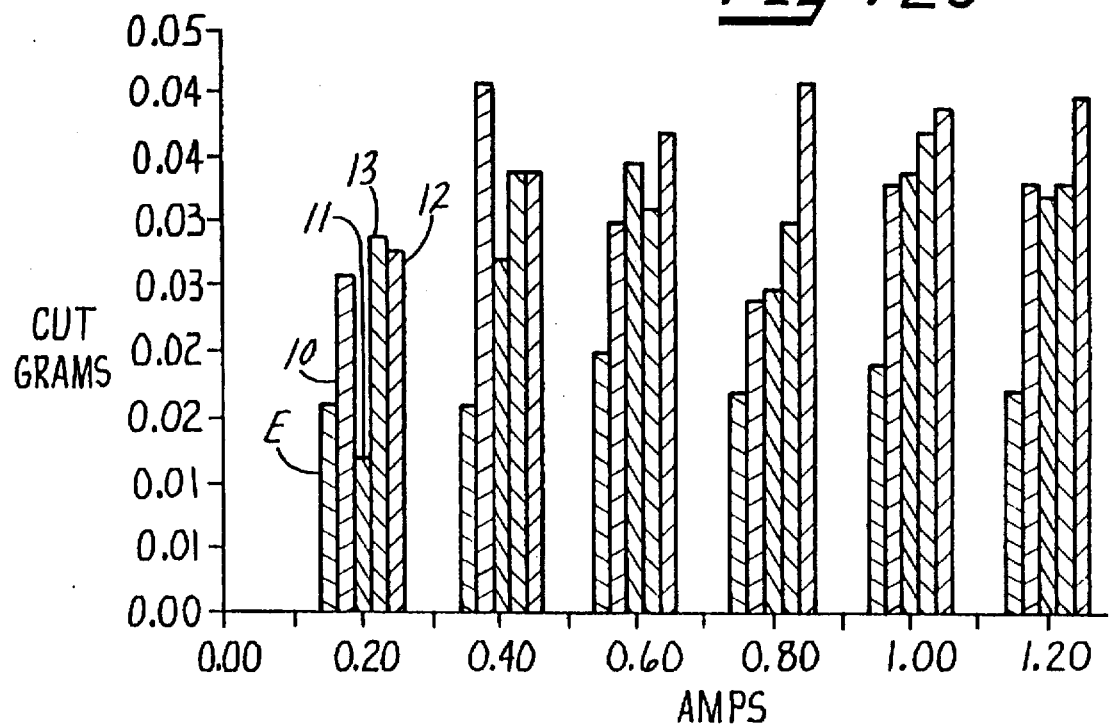
FIGS. 25–28 are bar graphs which show test results of workpiece removed as a function of power level for cylindrical brushes incorporating composite abrasive filaments in accordance with the present invention.
Figure 26:
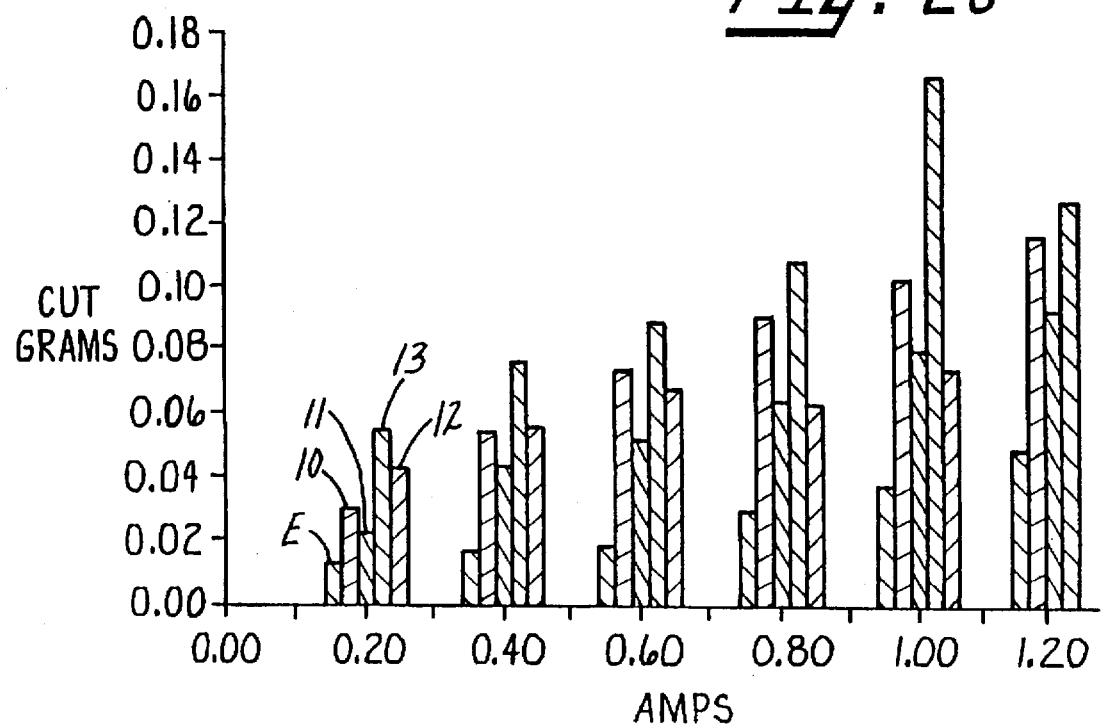
Figure 27:
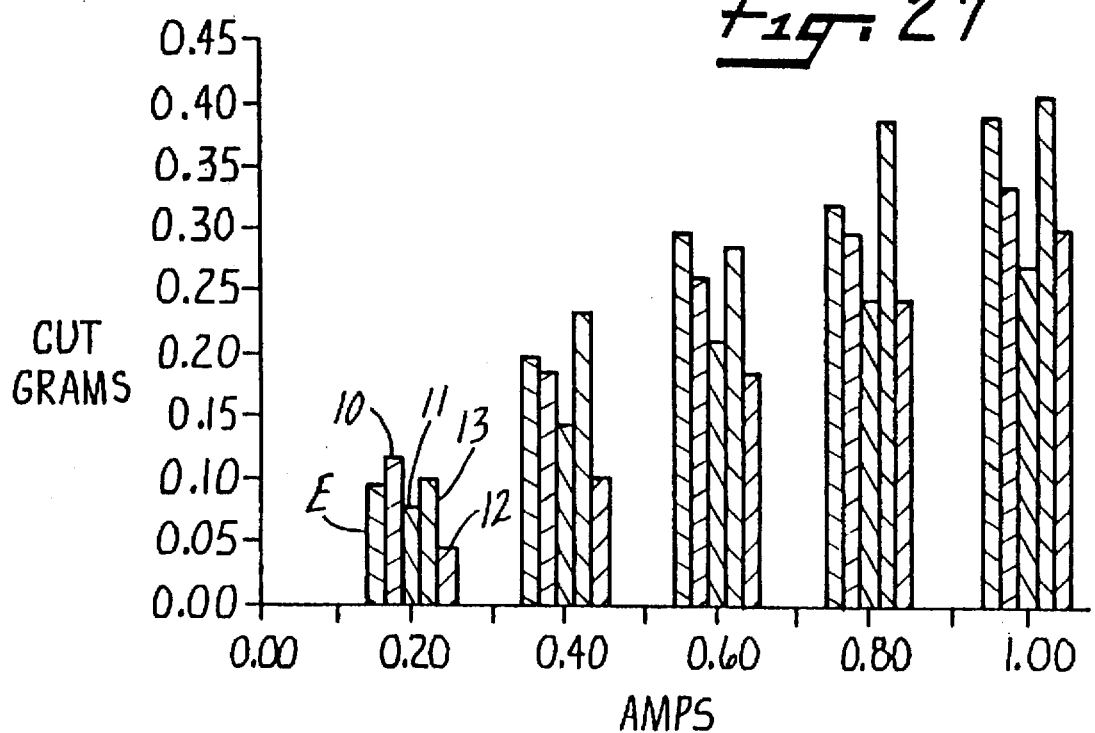
Figure 28:
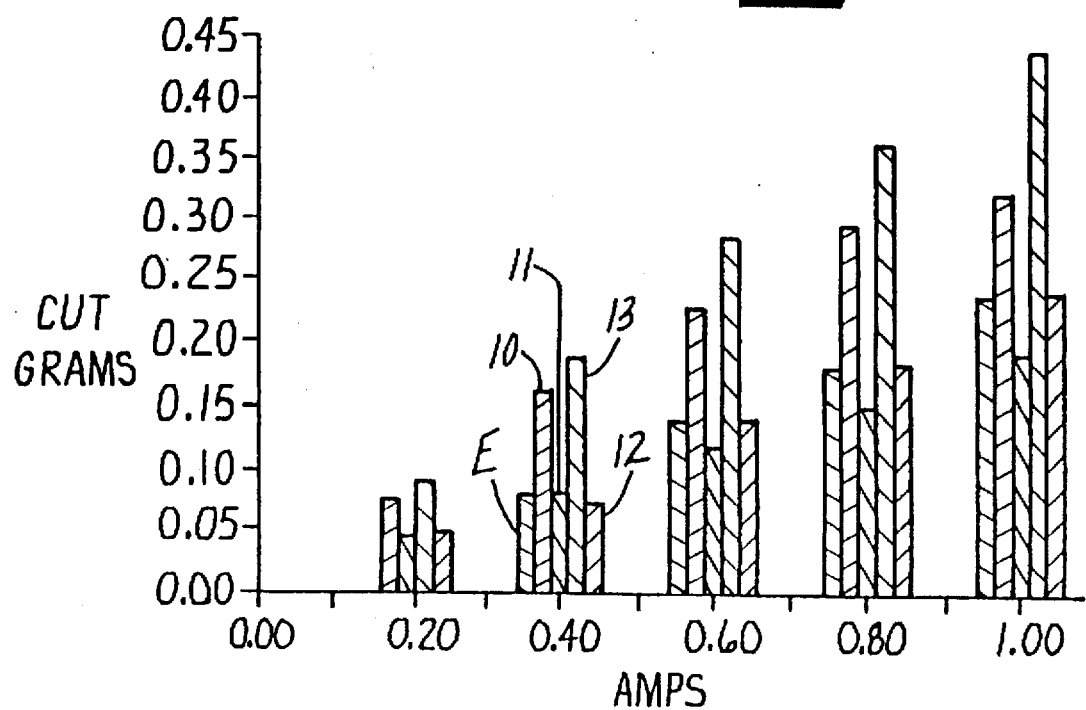

FIGS. 23 and 24 are similar to FIGS. 21–22 in that Example filaments 17–22 performed well on 1008 CRS steel screen (FIG. 24) but were not as aggressive on 1018 CRS steel plate (FIG. 23).

FIGS. 25–28 represent, in bar graph form, the results of abrasion testing using cylindrical brushes (10.2 cm OD) with very dense filament packing on the hubs. Filaments E and 10–13 were compared using a printed circuit board brushing apparatus known under the trade designation "Chemcut". The cylindrical brushes were turned at 2500 rpm against substrates of 1018 steel, 304 stainless steel, copper and 6061 T6 aluminum (FIGS. 25–28, respectively) at different power levels as indicated. Composite abrasive filaments of the present invention performed substantially better than abrasive-filled nylon abrasive filaments on 1018 CRS steel, 304 stainless steel, and performed comparatively well on copper and T6061 aluminum.

Various modifications and alterations of this invention will become apparent to those skilled in the art without departing from the scope and spirit of this invention, and it should be understood that this invention is not to be unduly limited to the illustrated embodiments set forth herein.

What is claimed is:

1. A method of abrading a workpiece with an abrasive article, the abrasive article having at least one composite abrasive filament mounted to a substrate, said method comprising creating relative movement between the substrate and a workpiece so that said at least one composite abrasive filament contacts and abrades the workpiece, the composite abrasive filament comprising at least one preformed core at least partially coated with thermoplastic elastomer having abrasive particles dispersed and adhered therein, the thermoplastic elastomer and the abrasive particles together comprising a hardened composition.

2. A method of abrading a workpiece with an abrasive article comprising at least one composite abrasive filament, the method comprising creating relative movement between the workpiece and composite abrasive filament so that the composite abrasive filament contacts and abrades the workpiece, the composite abrasive filament comprising at least one performed core at least partially coated with a thermoplastic elastomer having abrasive particles adhered and dispersed therein, the thermoplastic elastomer and the abrasive particles together comprising a hardened composition.

* * * * *

UNITED STATES PATENT AND TRADEMARK OFFICE
CERTIFICATE OF CORRECTION

PATENT NO. : 5,737,794
DATED : April 14, 1998
INVENTOR(S) : Barber, Jr. et al.

It is certified that error appears in the above-identified patent and that said Letters Patent is hereby corrected as shown below:

Column 7,
Line 12, insert -- to -- after "used"

Column 10,
Line 56, "is" should read -- in --

Column 13,
Line 18, within formula "C" should read $-\underset{C}{\overset{O}{\|}}-$ Column 15,
Line 28, "IV" should be subscript instead of superscript Column 19,
Line 61, "performed" should read -- preformed --

Column 27, Table 2,
"Performed" should read -- Preformed --

Column 34,
Line 51, "performed" should read -- preformed --

Signed and Sealed this

Nineteenth Day of February, 2002

Attest:

Attesting Officer

JAMES E. ROGAN
*Director of the United States Patent and Trademark Office*